United States Patent
Casto, Jr. et al.

(10) Patent No.: US 9,434,419 B1
(45) Date of Patent: Sep. 6, 2016

(54) FLEXIBLE FLAP ASSEMBLY FOR A VEHICLE AND KIT CONTAINING THE SAME

(71) Applicants: Clarence Russell Casto, Jr., Grove City, OH (US); Randy Lee Spires, Grove City, OH (US)

(72) Inventors: Clarence Russell Casto, Jr., Grove City, OH (US); Randy Lee Spires, Grove City, OH (US)

(*) Notice: Subject to any disclaimer, the term of this patent is extended or adjusted under 35 U.S.C. 154(b) by 0 days.

(21) Appl. No.: 14/798,403

(22) Filed: Jul. 13, 2015

Related U.S. Application Data

(63) Continuation-in-part of application No. 13/710,371, filed on Dec. 10, 2012, now Pat. No. 9,079,621.

(51) Int. Cl.
*B62D 25/18* (2006.01)
*B62D 25/16* (2006.01)

(52) U.S. Cl.
CPC .......... *B62D 25/163* (2013.01); *B62D 25/161* (2013.01); *B62D 25/182* (2013.01)

(58) Field of Classification Search
CPC combination set(s) only.
See application file for complete search history.

(56) References Cited

U.S. PATENT DOCUMENTS

| | | | |
|---|---|---|---|
| 1,660,981 A | 2/1928 | Williams | |
| 1,730,733 A | 10/1929 | Judd | |
| 1,780,400 A | 11/1930 | Nelson | |
| 2,141,140 A | 12/1938 | Johnson | |
| 2,461,044 A | 2/1949 | Ely | |
| 2,585,397 A | 2/1952 | McCollum, Jr. | |
| 2,617,662 A | 11/1952 | Jackson | |
| 2,826,428 A | 3/1958 | Lincoln | |
| 3,195,920 A * | 7/1965 | Knisely | B62D 25/188 122/31.1 |
| 3,213,830 A | 10/1965 | Wiesemann | |
| 3,237,963 A | 3/1966 | Menzer | |
| 3,333,868 A | 8/1967 | Sogoian | |
| 3,684,312 A | 8/1972 | Evans | |
| 3,778,086 A | 12/1973 | Moore et al. | |
| 3,791,337 A | 2/1974 | Schamblin | |
| 3,877,722 A | 4/1975 | Conner | |
| 3,934,901 A * | 1/1976 | Hammerly | B62D 25/188 280/851 |
| 3,999,776 A * | 12/1976 | Betts, Sr. | B62D 25/188 248/624 |
| 4,007,944 A * | 2/1977 | Dingess | B62D 25/188 248/289.31 |
| 4,043,568 A | 8/1977 | Hollon | |
| 4,180,230 A | 12/1979 | Sogoian | |
| 4,354,690 A * | 10/1982 | Hanson | B62D 25/188 280/851 |
| 4,505,010 A * | 3/1985 | Arenhold | B25B 31/00 24/456 |

(Continued)

OTHER PUBLICATIONS

First office action on the merits (Non-Final Rejection) in U.S. Appl. No. 13/710,371, mailed on Dec. 2, 2014.

(Continued)

*Primary Examiner* — Jeffrey J Restifo
*Assistant Examiner* — Erez Gurari
(74) *Attorney, Agent, or Firm* — The Law Office of Patrick F. O'Reilly III, LLC

(57) ABSTRACT

A flexible flap assembly configured to be mounted behind a wheel of a vehicle is disclosed herein. The flexible flap assembly includes a flap body portion, the flap body portion being formed from a flexible material; and a plurality of attachment members operatively coupled to an upper end region of the flap body portion, the plurality of attachment members being in the form of a plurality of retaining straps. The flexible flap assembly is configured to be releasably mounted to a portion of the vehicle using the plurality of attachment members. In one or more embodiments, the flexible flap assembly is provided as part of a kit, which also includes a carrying case and a flap reminder tag. A method of using the flexible flap kit is also disclosed.

16 Claims, 15 Drawing Sheets

(56) References Cited

U.S. PATENT DOCUMENTS

| | | | | |
|---|---|---|---|---|
| 4,695,070 A * | 9/1987 | Knox | ............ | B62D 25/188 280/851 |
| 4,726,599 A | 2/1988 | Antekeier et al. | | |
| 4,856,816 A | 8/1989 | Francis | | |
| 4,911,347 A | 3/1990 | Wilhite | | |
| 4,966,378 A * | 10/1990 | Cook | ............ | B62D 25/188 280/154 |
| 5,967,553 A * | 10/1999 | Cominsky | ............ | B62D 25/188 280/154 |
| 6,076,842 A * | 6/2000 | Knoer | ............ | B62D 25/188 224/42.31 |
| 6,186,527 B1 | 2/2001 | Monhollen et al. | | |
| 6,375,223 B1 | 4/2002 | Kirckof | | |
| 6,484,984 B2 | 11/2002 | Hawes | | |
| 6,485,059 B2 * | 11/2002 | Burnstein | ............ | B62D 25/188 280/851 |
| 6,994,376 B1 | 2/2006 | Deering et al. | | |
| 7,040,662 B2 | 5/2006 | Barr et al. | | |
| 7,475,911 B2 | 1/2009 | Edwards | | |
| 7,654,574 B2 | 2/2010 | Haynes | | |
| 8,807,665 B2 | 8/2014 | Perry | | |
| 9,045,174 B2 * | 6/2015 | Dixon | ............ | B62D 25/182 |
| 9,079,621 B1 * | 7/2015 | Casto, Jr. | ............ | B62D 25/188 |
| 2001/0052697 A1 | 12/2001 | Hawes | | |
| 2003/0178461 A1 | 9/2003 | Shattuck | | |
| 2004/0066028 A1 * | 4/2004 | Edwards | ............ | B62D 25/188 280/851 |
| 2005/0110266 A1 * | 5/2005 | Barr | ............ | B62D 25/188 280/847 |
| 2006/0103129 A1 * | 5/2006 | Edwards | ............ | B62D 25/188 289/848 |
| 2006/0208476 A1 * | 9/2006 | Collins | ............ | B62D 25/188 280/851 |
| 2006/0284408 A1 * | 12/2006 | Edwards | ............ | B62D 25/188 280/851 |
| 2010/0137112 A1 | 6/2010 | Harker | | |
| 2012/0024921 A1 | 2/2012 | Pryor | | |
| 2012/0119564 A1 | 5/2012 | Perry | | |
| 2013/0221650 A1 * | 8/2013 | Wiltshire | ............ | B62D 25/188 280/847 |
| 2014/0252754 A1 * | 9/2014 | Ramsey | ............ | B62D 25/166 280/851 |

OTHER PUBLICATIONS

Notice of Allowance in U.S. Appl. No. 13/710,371, mailed on Mar. 12, 2015.

* cited by examiner

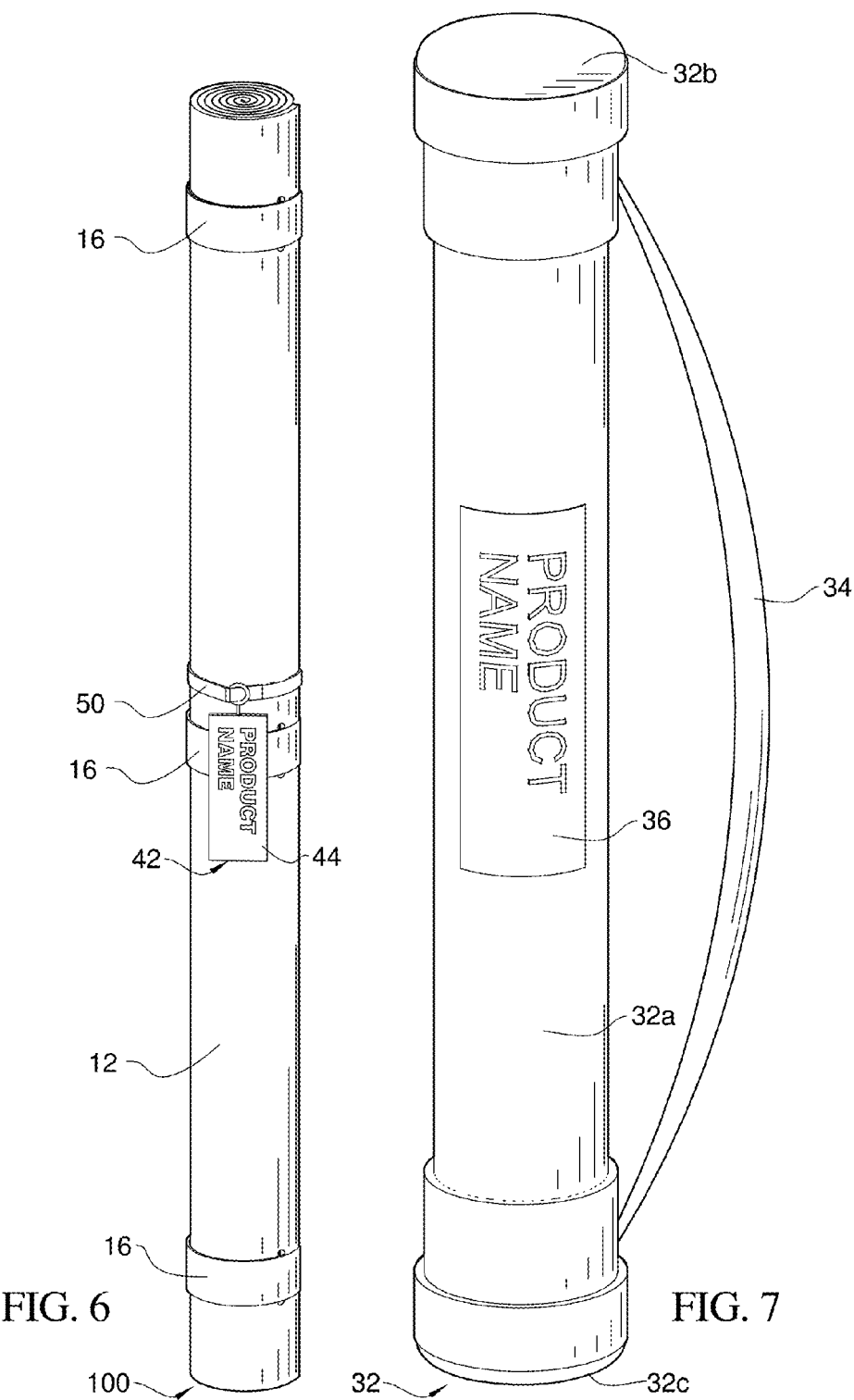

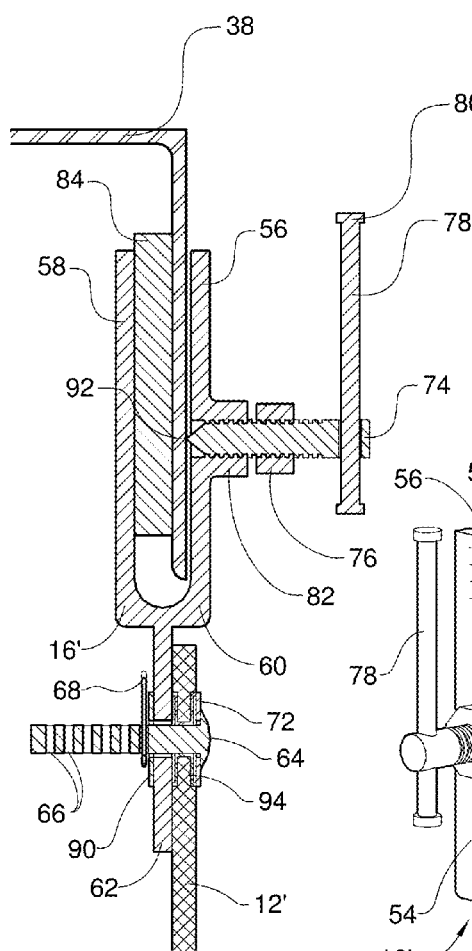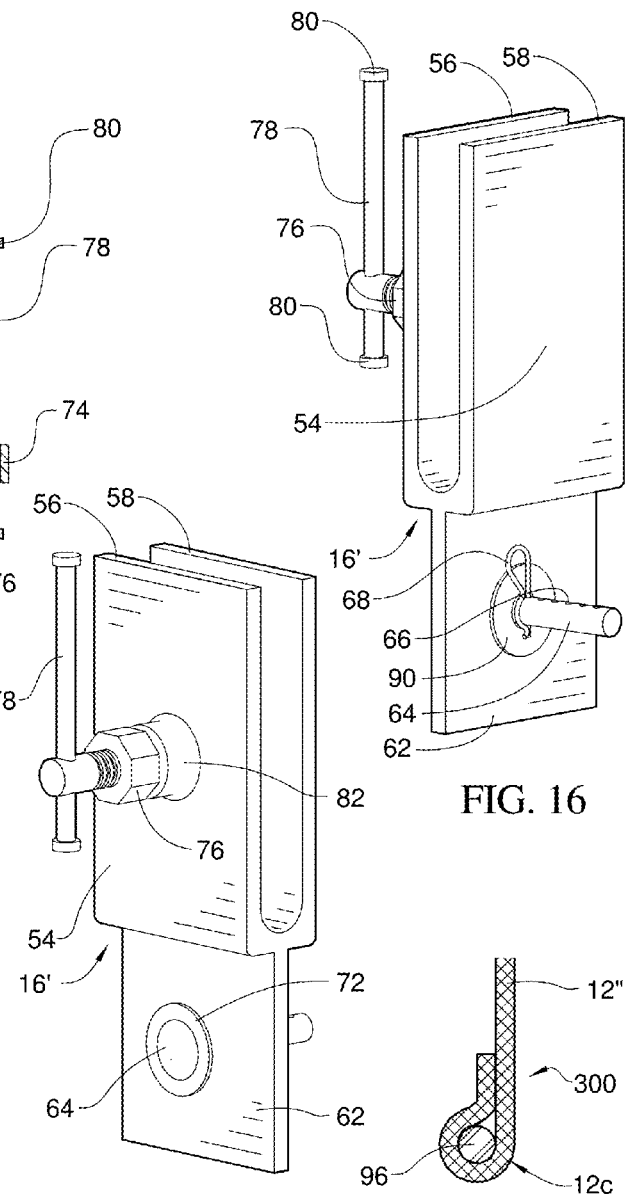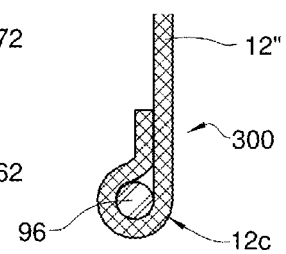
FIG. 14
FIG. 15
FIG. 16
FIG. 17

FLEXIBLE FLAP ASSEMBLY FOR A VEHICLE AND KIT CONTAINING THE SAME

CROSS-REFERENCE TO RELATED APPLICATIONS

This patent application is a continuation-in-part application of, and claims priority from, U.S. Non-Provisional patent application Ser. No. 13/710,371, entitled "Flexible Flap Assembly For A Vehicle And Kit Containing The Same", filed on Dec. 10, 2012, which is incorporated by reference herein in its entirety by this reference thereto.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a flexible flap assembly configured to be mounted on the exterior of a vehicle. More particularly, the invention relates to a flexible flap assembly configured to be mounted behind a wheel of a vehicle, and a kit containing the same.

2. Background

Most states in the United States of America have statutes that mandate the use of mud flaps behind the rearmost wheels of trucks (e.g., behind the rearmost wheels of a trailer of a tractor trailer). These flaps help prevent road debris, snow, and rain from being thrown by the rearmost wheels of the truck, and onto the windshield on a vehicle travelling therebehind. Although, it is quite common for a trailer, which travels many thousands of miles in a short period of time, to eventually lose one or more of its mud flaps. The vibrations inherently present during road travel, which are combined with the degradation of the conventional mud flap material resulting from adverse weather conditions, results in the separation of the conventional mud flap from the truck mounting bracket (e.g., the mud flap material is torn from its bracket and is lost on the side of the road during travel).

Unfortunately, for various reasons, the missing mud flaps on trucks are not always replaced in a timely manner, or in some cases, even at all. In order to replace a conventional mud flap, specific tools are required (e.g., a screwdriver, a wrench, etc.). However, drivers do not always carry the necessary tools with them on the road. Thus, without the necessary tools at hand, the driver must call a service repair truck to replace the missing mud flap. The utilization of a service repair truck is both expensive and time consuming (i.e., the driver has to wait on the side of the road until the service repair truck arrives, which could take an hour or more). Consequently, many truck drivers simply decide to forgo the replacement of the missing mud flap.

Also, in the trucking industry, it is quite common for a driver to pick up a trailer at a first location, transport the trailer to a second, remote location, and then pick up another trailer for transport to a different location. As such, when picking up a new trailer for transport, the driver may suddenly discover that the trailer is missing one or more mud flaps. Although, because a truck driver is often on a strict delivery schedule, he or she may not have time to replace a conventional mud flap. Thus, the driver will decide just to transport the trailer without replacing the missing mud flap, and take the risk that a law enforcement officer will not notice the statutory violation. However, if the missing mud flap is observed by a law enforcement officer, the driver will not only potentially incur the financial consequences of a ticket, he or she will also lose valuable transport time resulting from the traffic stop by the law enforcement officer. Thus, the decision not to replace the missing mud flap on the trailer can have both temporal and financial consequences for the truck driver.

Therefore, what is needed is a flexible flap assembly that can be quickly and easily installed on a vehicle (e.g., a truck) that is missing a mud flap. Moreover, a flexible flap assembly is needed that is capable of being easily installed on a vehicle (e.g., a truck) without the use of any tools. Furthermore, there is a need for a flexible flap assembly kit that contains the flexible flap assembly, a carrying case for facilitating stowage of the flexible flap assembly, and a flap reminder tag for preventing its user from inadvertently leaving the flexible flap assembly on a vehicle (e.g., a trailer) after it has been dropped off at its destination.

BRIEF SUMMARY OF EMBODIMENTS OF THE INVENTION

Accordingly, the present invention is directed to a flexible flap assembly and a kit containing the same that substantially obviates one or more problems resulting from the limitations and deficiencies of the related art.

In accordance with one or more embodiments of the present invention, there is provided a flexible flap assembly configured to be mounted behind a wheel of a vehicle. The flexible flap assembly includes a flap body portion, the flap body portion being formed from a flexible material; and a plurality of attachment members operatively coupled to an upper end region of the flap body portion, the plurality of attachment members being in the form of a plurality of retaining straps. The flexible flap assembly is configured to be releasably mounted to a portion of the vehicle using the plurality of retaining straps.

In a further embodiment of the present invention, the flap body portion is formed from a flexible polymeric material.

In yet a further embodiment, the flexible polymeric material forming the flap body portion comprises a vinyl material.

In still a further embodiment, the flap body portion is readily capable of being rolled and unrolled so as to facilitate the storage of the flexible flap assembly.

In yet a further embodiment, the flexible flap assembly is configured to be mounted to, and dismounted from, the portion of the vehicle without the use of tools.

In still a further embodiment, the plurality of retaining straps comprise a plurality of cable ties.

In yet a further embodiment, each of the plurality of cable ties comprises a first end and a second end disposed opposite to the first end, the first end of each of the plurality of cable ties having a pointed tip, the second end of each of the plurality of cable ties having a ratchet disposed within a partially enclosed housing, each of the plurality of cable ties further comprising an integrally formed gear track formed thereon that is configured to engage with the ratchet disposed at the second end.

In still a further embodiment, the flap body portion has an upper end region and a lower end region disposed opposite to the upper end region, the upper end region of the flap body portion comprising a plurality of spaced-apart apertures, each of the plurality of retaining straps being received within a respective one of the plurality of spaced-apart apertures in the upper end region of the flap body portion.

In yet a further embodiment, the upper end region of the flap body portion of the flexible flap assembly further comprises at least one reinforcing member surrounding at least one of the plurality of spaced-apart apertures.

In still a further embodiment, the lower end region of the flap body portion comprises an elongate rod for increasing the weight of the lower end region of the flap body portion so as to prevent the flap body portion from blowing upward when the flexible flap assembly is installed on the vehicle.

In yet a further embodiment, the elongate rod is disposed within a pocket formed in the lower end region of the flap body portion.

In accordance with one or more other embodiments of the present invention, there is provided a flexible flap assembly configured to be mounted behind a wheel of a vehicle. The flexible flap assembly includes a flap body portion, the flap body portion being formed from a flexible material; a stiffening member, the stiffening member being disposed adjacent to an upper edge of the flap body portion; and a plurality of attachment members operatively coupled to an upper end region of the flap body portion and the stiffening member. The flexible flap assembly is configured to be releasably mounted to a portion of the vehicle using the plurality of attachment members.

In a further embodiment of the present invention, the flexible flap assembly further comprises a plurality of fasteners attaching the stiffening member to the flap body portion adjacent to the upper edge thereof.

In yet a further embodiment, the plurality of fasteners comprises a plurality of retaining bolts that matingly engage with a plurality of nuts.

In still a further embodiment, the stiffening member is integrally formed with the upper end region of the flap body portion.

In yet a further embodiment, the flexible flap assembly is configured to be mounted to, and dismounted from, the portion of the vehicle without the use of tools.

In still a further embodiment, the portion of the vehicle is a mounting bar behind the wheel of the vehicle.

In yet a further embodiment, the plurality of attachment members comprise a plurality of mounting brackets, each of the plurality of mounting brackets having an adjustable bolt with a handle disposed at an end thereof for securing the flexible flap assembly to the portion of the vehicle.

In still a further embodiment, each of the plurality of mounting brackets is generally Y-shaped, each mounting bracket having a yoke portion for engaging the portion of the vehicle and a depending leg portion extending outwardly from a base of the yoke portion, each of the depending leg portions of the mounting brackets being attached to the upper end region of the flap body portion.

In yet a further embodiment, each of the adjustable bolts of the mounting brackets is disposed through an opposed leg of the yoke portion.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 6 is a perspective view of a flexible flap assembly in a rolled state, according to an embodiment of the invention;

FIG. 7 is a perspective view of a carrying case of a flexible flap kit according to an embodiment of the invention;

FIG. 14 is a partial sectional view of a flexible flap assembly attached to a mounting bar assembly of a truck according to a second embodiment of the invention, which is cut along cutting plane line A-A in FIG. 9;

FIG. 15 is a rear perspective view of a mounting bracket of the flexible flap assembly, according to the second embodiment of the invention;

FIG. 16 is a frontal perspective view of a mounting bracket of the flexible flap assembly, according to the second embodiment of the invention; and FIG. 17 is a partial sectional view of an alternative flexible flap design, according to an embodiment of the invention;

Throughout the figures, the same parts are always denoted using the same reference characters so that, as a general rule, they will only be described once.

DETAILED DESCRIPTION OF EMBODIMENTS OF THE INVENTION

Figure 1:
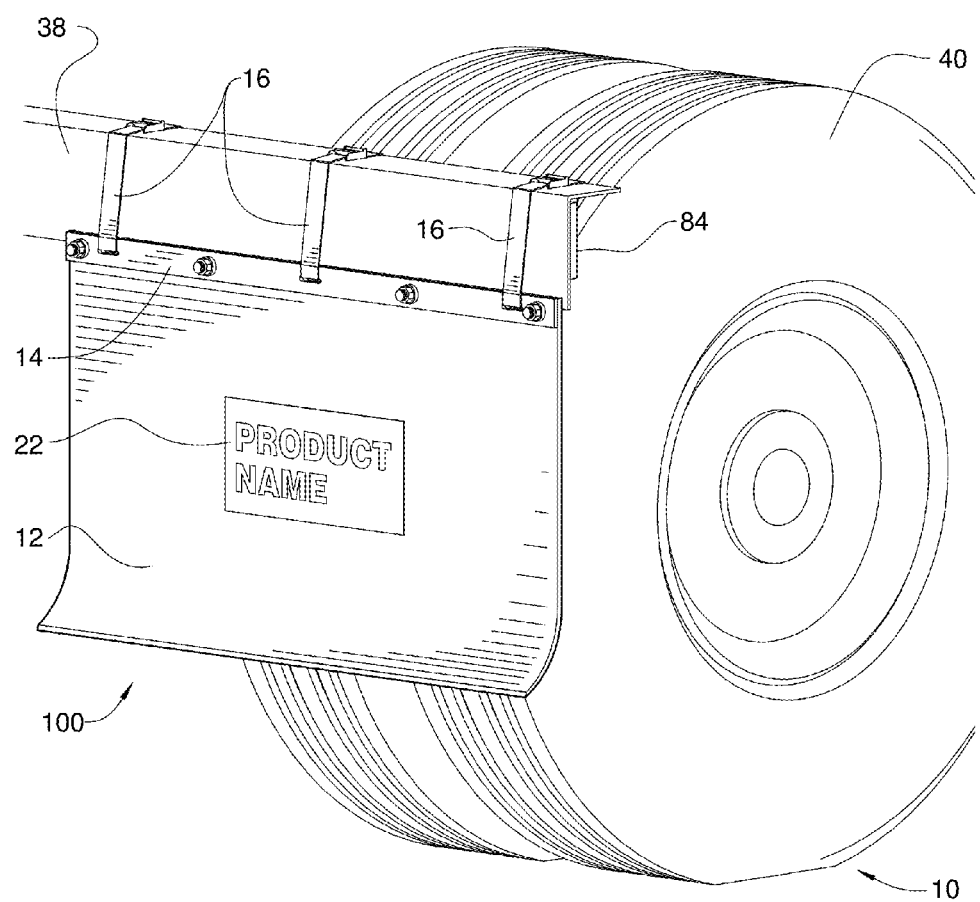
FIG. 1 is a rear perspective view of a flexible flap assembly attached to a mounting bar assembly of a truck, according to a first embodiment of the invention.
Figure 2:
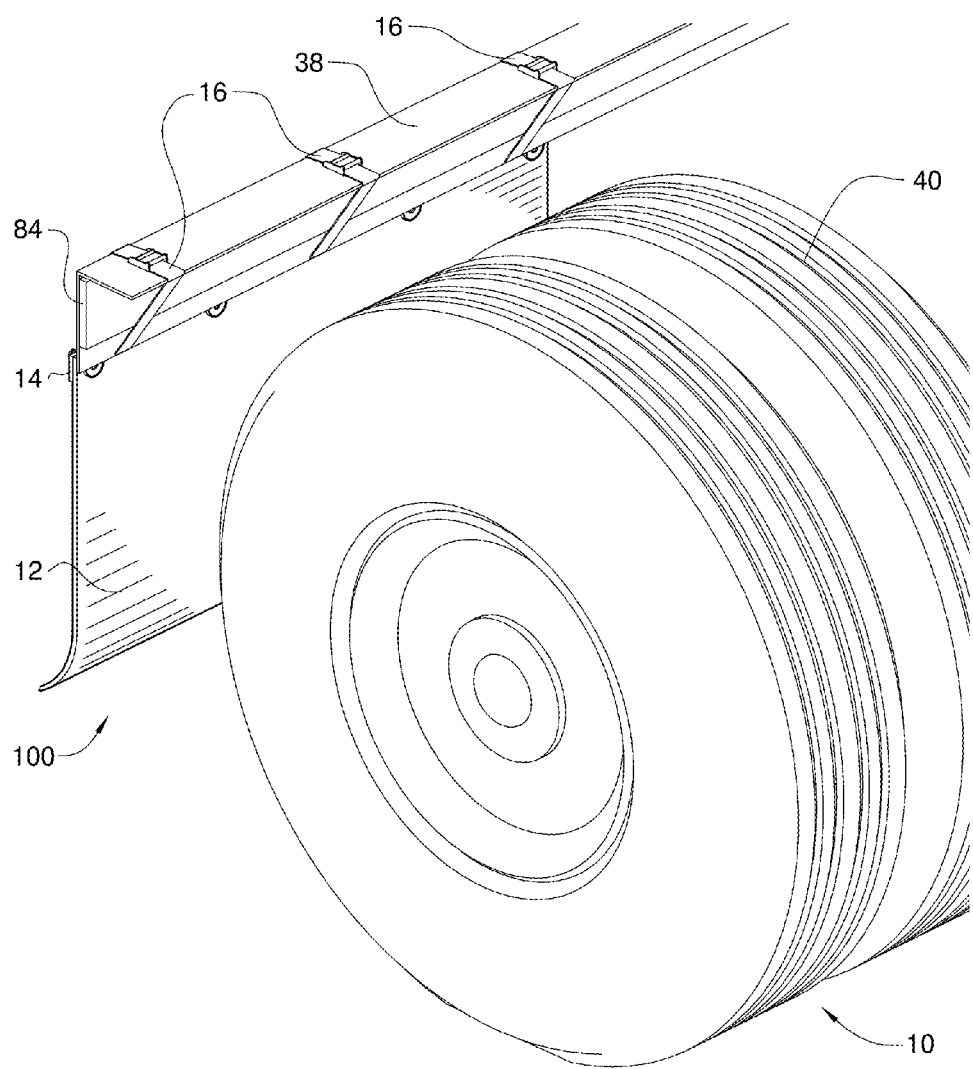
FIG. 2 is a frontal perspective view of the flexible flap assembly attached to a mounting bar assembly of a truck, according to the first embodiment of the invention.

A first embodiment of the flexible flap assembly in a mounted state is seen generally at 100 in FIGS. 1 and 2. As shown in these figures, the flexible flap assembly 100 is configured to be mounted behind the wheel of a vehicle, such as behind the rearmost wheel 40 of a truck 10 (e.g., behind the rearmost wheel of a semi-trailer that is pulled by a cab). When it is installed on such a vehicle, the flexible flap assembly substantially prevents its rearmost wheel 40 from throwing dirt, water, or other foreign objects on the windshields of vehicles following therebehind. The inventive flexible flap assembly is a unique type of mud flap assembly that is particularly well adapted to be quickly mounted to, and dismounted from, a vehicle.

As depicted in FIGS. 1 and 2, the flexible flap assembly of the first embodiment generally comprises a flap body portion 12 formed from a flexible material, a stiffening member 14 attached to the top of the flap body portion 12, and a plurality of attachment members 16 that secure the flexible flap assembly to a mounting bar assembly 38, 84 of a truck 10. In the illustrated embodiment, it can be seen that the mounting bar assembly 38, 84 of the truck 10 comprises a flap angle iron mounting bracket 38, which is attached to flat mounting bar 84. However, those of ordinary skill in the art will appreciate that the flap mounting assembly could be secured to other types of vehicle mounting brackets and/or bars as well.

In the illustrated embodiment of FIGS. 1 and 2, it can be seen that the flexible flap assembly is secured to the mounting bar assembly 38, 84 of the truck 10 using a total of three (3) attachment members 16, which ensures that the flexible flap assembly remains securely affixed to the truck 10 while the truck 10 is subjected to the normal bumps and vibrations associated with road travel. In the first embodiment, it can be seen that the attachment members 16 of the flexible flap assembly 100 are in the form of straps with buckles. Advantageously, these attachment members 16 do not require the use of any tools for securement to the mounting bar assembly 38, 84 of the truck 10. Not only does this substantially reduce the time which is required to install the flexible flap assembly on the vehicle, but it also permits the flexible flap assembly 100 to be installed by a user who does not have access to any tools.

Now, referring to FIGS. 3-5, the various components of the flexible flap assembly 100 according to the first embodiment will be described in detail. Initially, with reference to FIGS. 4 and 5, it can be seen that the flap body portion 12 has two oppositely disposed sides, namely a rear side 12a and front side 12b. When it is installed on a vehicle, the rear side 12a of the flap body portion 12 faces away from the wheel of the vehicle (e.g., wheel 40 of truck 10), while the front side 12b of the flap body portion 12 faces towards the vehicle wheel (e.g., wheel 40 of truck 10). The front and rear sides 12b, 12a of the flap body portion 12 are bounded in a transverse direction by lateral edges 12e, 12f, and in vertical direction by top edge 12d and bottom edge 12c. In a preferred embodiment of the invention, indicia 22 is inscribed on the rear side 12a of the flap body portion 12 that contains the product name associated with the device (e.g., the trade name of the flexible flap assembly).

Figure 3:
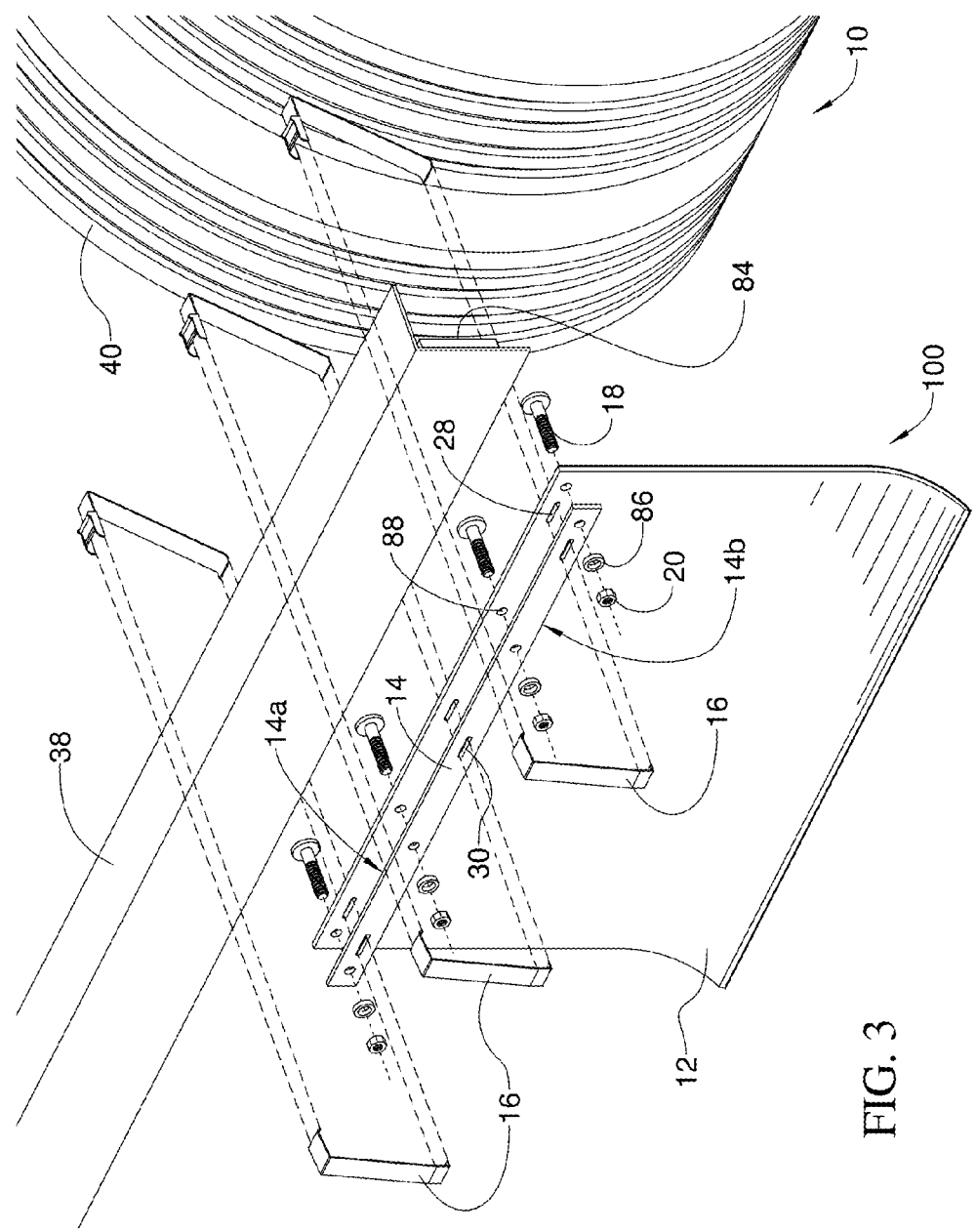
FIG. 3 is an exploded perspective view of the flexible flap assembly illustrated with a mounting bar assembly of a truck, according to the first embodiment of the invention.

Turning to the exploded view of FIG. 3, it is seen that the flap body portion 12 is provided with a first plurality of apertures 28 spaced along the top edge 12d thereof. In the illustrated embodiment, the apertures 28 are in the form of elongated slots for accommodating the attachment straps 16, and a substantially equal distance is provided between them (i.e., the apertures 28 are substantially equally spaced apart). Also, as shown in FIG. 3, the flap body portion 12 is provided with a second plurality of apertures 88 spaced along the top edge 12d thereof for receiving retaining bolts 18, which are used to attach the stiffening member 14 to the flap body 12. Unlike the apertures 28, the second plurality of apertures 88 are generally circular in shape for accommodating the generally circular cross-section of the retaining bolts 18.

In a preferred embodiment, the flap body portion 12 is formed from a flexible polymeric material (i.e., rubber) that permits the flap body portion 12 to be easily rolled into a cylindrical shape so as to permit the compact storage thereof (e.g., see FIG. 6). Advantageously, this enables the flexible flap assembly 100 to be easily stowed away while it is not being used.

In one exemplary embodiment of the invention, the flap body portion 12 has a width of approximately twenty-four (24) inches, a height of approximately thirty (30) inches, and a thickness of approximately one-quarter (¼) of an inch. The preferred width dimension of approximately twenty-four (24) inches is substantially equal to the width of the two tires forming the wheel of a typical tractor trailer. It is highly desirable that the flap body portion 12 extend substantially the entire width of the wheel that it is protecting so that it is capable of blocking any debris that is being thrown by the wheel. The preferred dimensional height of approximately thirty (30) inches is generally equal to the height of a standard tractor trailer tire minus a predetermined amount of ground clearance between the bottom edge 12c of flap body portion 12 and the top of the pavement when the flexible flap assembly 100 is installed on the tractor trailer. The preferred thickness of approximately one-quarter (¼) of an inch enables the flap body portion 12 to be sufficiently durable for withstanding road conditions, while still being readily pliable so as to permit the rolling thereof. While these are exemplary dimensions of the flap body portion 12 when installed on a typical semi-trailer, it is to be understood that, in other embodiments of the invention, the dimensions of the flap body portion 12 could be suitably altered so as to accommodate varying wheel dimensions on other vehicles.

Referring again to FIGS. 3-5, the stiffening member 14 will now be described. As shown in FIGS. 4 and 5, the stiffening member 14 is attached to the upper end region of the flap body portion 12 by means of a plurality of retaining bolts 18 and associated nuts 20. In a preferred embodiment, the top edge 14a of the stiffening member 14 is substantially aligned with the top edge 12d of the flap body portion 12 (see e.g., FIG. 4). The stiffening member 14 enhances the functionality of the flexible flap assembly 100 in several different ways. First, the stiffening member 14 adds structural rigidity to the top of the flap body portion 12 so that the upper end region of the pliable flap body portion 12 maintains a generally planar shape (i.e., except for the slightly curved bottom portion), and does not readily deform. As a result, the top edge 12d of the flap body portion 12 and the part of the flap body portion 12 disposed immediately therebelow does not undesirably curl in a transverse direction (i.e., the lateral cross-section remains generally rectangular throughout the length of the flap body portion 12). Secondly, the stiffening member 14 reinforces the top of the flap body portion 12 so that attachment members 16 are much less likely to tear the upper end region of the flap body portion 12. Because the attachment members 16 suspend the flexible flap assembly 100 from the portion of the vehicle on which it is mounted (e.g., from mounting bar assembly 38, 84 of truck 10), they support the weight of the flap assembly 100. Additional forces are experienced by the attachment members 16 due to the effect of wind pressure acting on the flap assembly 100, as well as the inertia effects resulting from the moving vehicle. In turn, the attachment members 16 exert equal and opposite forces on the upper end region of the flap body portion 12. As a result, stress concentrations will naturally develop around each of the apertures 28 in the flap body portion 12. The stiffening member 14 helps to prevent these stress concentrations from resulting in a rupture of the material of the flap body portion 12 between the top of the apertures 28 and the top edge 12d of the flap body portion 12.

As best shown in the exploded view of FIG. 3, the stiffening member 14 preferably contains a plurality of apertures 30 that substantially align with the plurality of apertures 28 in the flap body portion 12. Like the apertures 28 in the flap body portion 12, the apertures 30 are in the form of elongated slots for accommodating attachment straps, and a substantially equal distance is provided between them (i.e., the apertures 30 are substantially equally spaced apart). The apertures 30 are also preferably vertically centered between the top edge 14a and bottom edge 14b of the stiffening member 14. In an exemplary embodiment, the stiffening member 14 is formed from a piece of steel having a width of approximately twenty-four (24) inches, a height of approximately two (2) inches, and a thickness of approximately one-eighth (⅛) of an inch. Although, in other embodiments of the invention, the stiffening member 14 could be formed using other suitable materials and dimensions.

In a preferred embodiment of the invention, the stiffening member 14 is attached to the upper end region of the flap body portion 12 using a plurality of retaining bolts 18 (e.g., elevator bolts having a large diameter head) and a plurality of associated nuts 20. Also, as shown in FIGS. 3 and 4, a retaining bolt washer 86 is sandwiched between each nut 20 and the stiffening member 14. Each of the plurality of retaining bolts 18 has a flat head that lies against the surface of the flap body portion 12 without presenting much of an obstruction above the surface of the flap body portion 12. In one embodiment, four (4) one-quarter (¼) inch by one (1) inch retaining bolts 18 are used in conjunction with mating nuts 20 to secure the stiffening member 14 to the flap body portion 12. Also, in one embodiment of the invention, the flap body portion 12 and the stiffening member 14 are each provided with a plurality of circular apertures for accommodating the shafts of the retaining bolts 18. In this embodiment, each of the apertures in the flap body portion 12 is substantially aligned with each of the apertures in the stiffening member 14 so as to easily accommodate the passage of each retaining bolt shaft therethrough. In an alternative embodiment of the invention, the flap body portion 12 is provided with a plurality of circular apertures for accommodating the shafts of the elevator bolts 18, but the stiffening member 14 is formed from a piece of steel having a series of elongated slots disposed along the length thereof, wherein the elongated slots are substantially equally spaced apart from one another. In this alternative embodiment, three of the elongated slots are used for receiving the three attachment members 16 therethrough, while a portion of four of the other elongated slots are used for receiving the shafts of the four retaining bolts 18.

Figure 4:
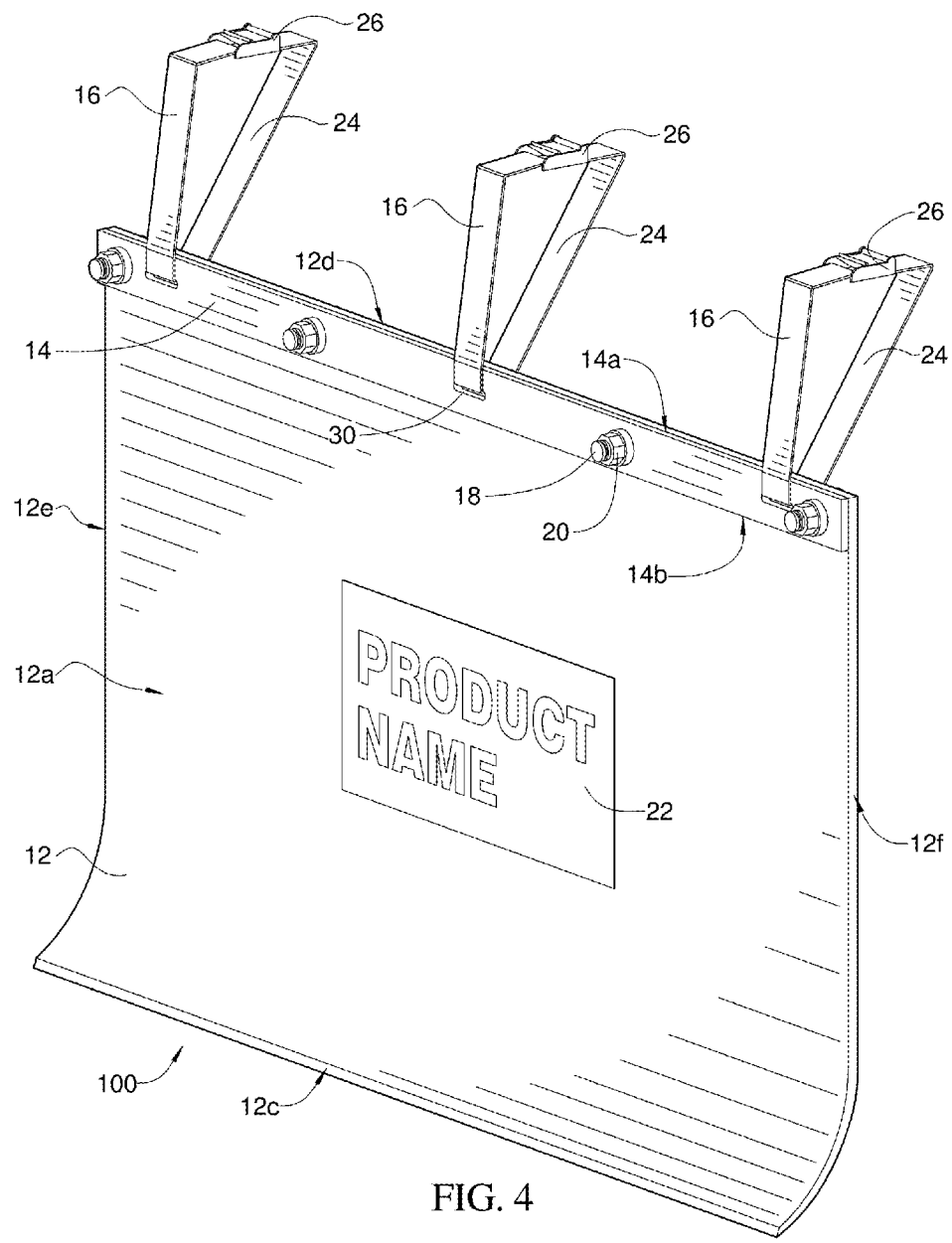
FIG. 4 is a rear perspective view of the flexible flap assembly, according to the first embodiment of the invention.
Figure 5:
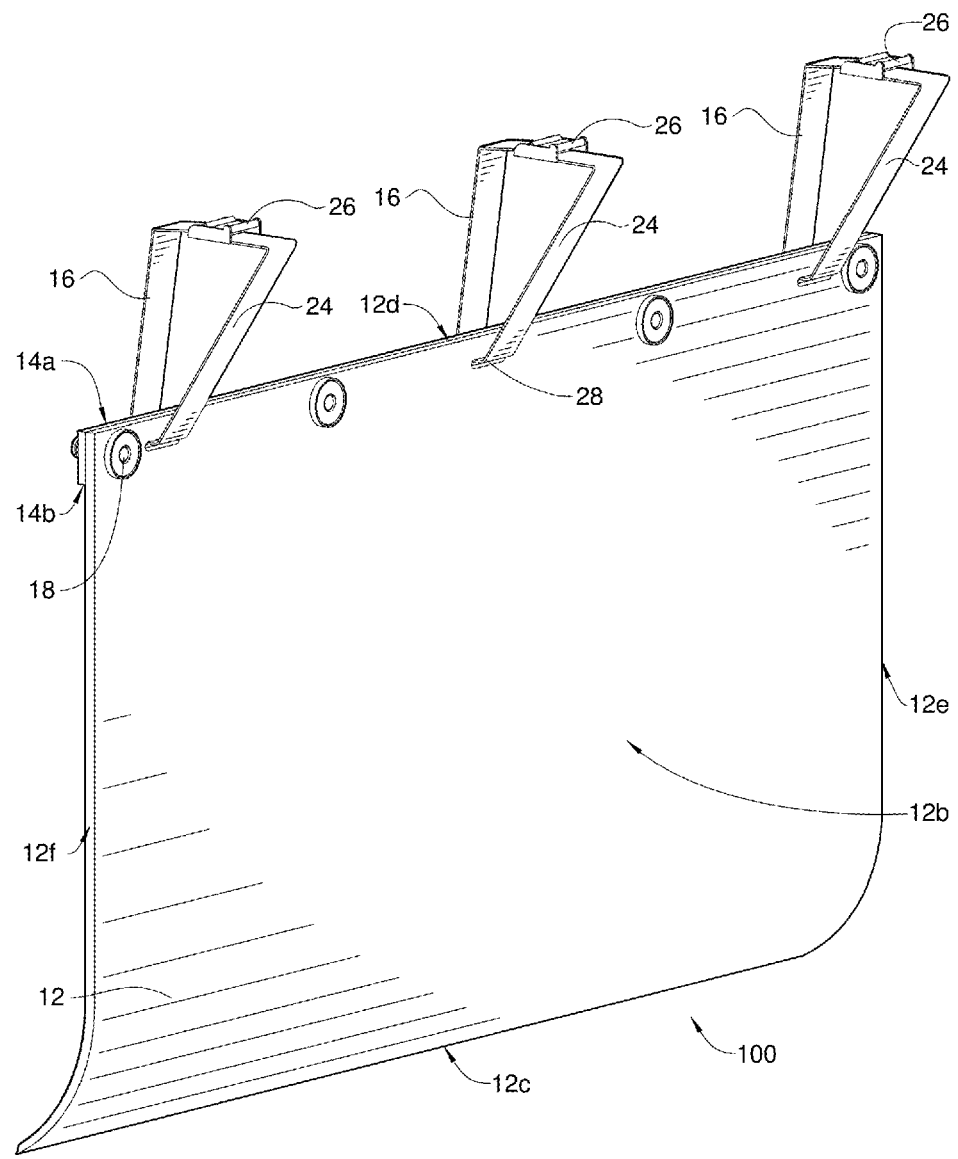
FIG. 5 is a frontal perspective view of the flexible flap assembly, according to the first embodiment of the invention.

In the illustrated embodiment, the heads of the retaining bolts 18 are disposed against the front side 12b of the flap body portion 12, and the nuts 20 are disposed on the rear side 12a of the flap body portion 12 (e.g., see FIGS. 4 and 5). This arrangement is advantageous because the substantially flat heads of the retaining bolts 18 will lie substantially flat against the portion of the vehicle (e.g., truck 10) to which the flexible flap assembly 100 is mounted. For example, when the flexible flap assembly 100 is mounted to a semi-trailer, the flat heads of the retaining bolts 18 will lie generally flat against the rear face of mud flap mounting bar assembly (flap angle iron mounting bracket 38), which is typically disposed behind the rearmost wheels of a semi-trailer. While it is preferred that the nuts 20 are disposed on the rear side 12a of the flap body portion 12, the invention is not so limited. Rather, the nuts 20 could be disposed on the front side 12b of the flap body portion 12 if such an arrangement is deemed suitable for a particular application of the invention.

Referring again to FIGS. 4 and 5, the plurality of attachment members 16 will now be described. As shown in the illustrated embodiment of the invention, each attachment member 16 comprises an adjustable mounting strap 24 with an associated buckle 26 disposed thereon. Each mounting strap 24 is disposed through a respective aperture 28 in the flap body portion 12 and a respective aperture 30 in the stiffening member 14 (e.g., see FIG. 3). Advantageously, the buckle 26 on each mounting strap 24 can be operated by a user of the flexible flap assembly 100 without the use of any tools. In addition, the buckle 26 enables the length of each mounting strap 24 to be selectively adjusted by the user so that vehicle mounting members with different cross-section dimensions can be accommodated. When the user wants to mount the flexible flap assembly 100 on a vehicle, he or she simply releases each of the buckles 26, slides each mounting strap 24 over the vehicle mounting member, adjusts the length of each mounting strap 24, and tightens each of the buckles 26 against their associated straps 24 to secure the flexible flap assembly 100 in place.

In a preferred embodiment of the invention, the mounting straps 24 are formed from a strong and durable material, such as medium strength nylon, while the buckles 26 are formed from aluminum. Preferably, the buckles 26 are in the form of cam-locking buckles with rotatable, spring-loaded latches for securing a loose end of a respective mounting strap 24. In an exemplary embodiment of the invention, each nylon strap 24 has a width of one (1) inch and a length of eighteen (18) inches. Although, one of ordinary skill in the art will appreciate that other suitable lengths and widths can be used for the mounting straps 24.

In order to greatly enhance the functionality thereof, the flexible flap assemblies 100, 200 of the embodiments illustrated herein are provided as part of a flexible flap kit. In addition to the flexible flap assemblies 100, 200, the flexible flap kit also comprises a flap carrying case 32 (see FIG. 7) and a flap reminder tag 42 (see FIG. 8). Advantageously, the flap carrying case 32 houses the flexible flap assembly 100, 200 when it is not being used, while the flap reminder tag 42 reminds a user of the device that his or her flexible flap assembly 100, 200 is presently mounted on a truck (e.g., to ensure that the user does not forget to remove his or her flexible flap assembly 100, 200 from the truck after it is done being used).

Turning now to FIG. 7, the carrying case 32 of the flexible flap kit will be described in detail. As illustrated in this figure, the carrying case 32 is generally cylindrical in shape with a circular side wall 32a and two closed ends 32b, 32c. At least one end 32b, 32c of the carrying case 32 contains a removable end cap so that the rolled flexible flap assembly 100, 200 can be placed inside the carrying case 32. In one embodiment, the first end 32b of the carrying case 32 contains a removable end cap, while the second end 32c of the carrying case 32 is fixedly attached to the circular side wall 32a and contains no removable portions. In another embodiment, both the first and second ends 32b, 32c of the carrying case 32 contain a removable end cap. In one embodiment of the invention, the removable end cap at the first end 32b of the carrying case 32 has a circular shape and contains a plurality of threads disposed about the outer periphery thereof. This plurality of threads on the outer periphery of the end cap matingly engage with a plurality of complementary threads disposed on the inner periphery of the circular side wall 32a. Also, the end cap in this embodiment also preferably includes a finger engagement portion extending from the outer surface thereof so that a user can easily rotate the threaded end cap, thereby opening and closing carrying case 32. In an alternative embodiment, the removable end cap at the first end 32b of the carrying case 32 has a cylindrical cup shape (e.g., as illustrated in FIG. 7 with reference numeral 32b pointing to the circular end thereof) and engages an end portion of the circular side wall 32a in a snap-fit type manner (i.e., the removable end cap is made from a flexible plastic that is capable of elastically deforming when it is fitted onto the end portion of the circular side wall 32a).

In an exemplary embodiment, the carrying case 32 has a length of approximately twenty-five and one-half (25½) inches and a diameter of approximately six (6) inches. Also, in an exemplary embodiment, the carrying case 32 is formed from a semi-rigid thermoplastic polymer, such as a polyvinyl chloride (PVC), which is both durable and relatively lightweight. Although, it is to be understood that, in other embodiments of the invention, the carrying case 32 can be formed using other suitable dimensions and materials.

Referring again to FIG. 7, it can be seen that the carrying case 32 is preferably provided with a shoulder strap 34 that is mounted to the circular side wall 32a thereof so as to facilitate the carrying of the case 32 by a user. The shoulder strap 34 of the carrying case 32 is designed to fit around a user's shoulder when he or she is carrying the flexible flap kit. Preferably, the shoulder strap 34 of the carrying case 32 is formed from a nylon webbing material that is both strong and lightweight. However, in other embodiments of the invention, the shoulder strap 34 can also be formed using other suitable materials. In a preferred embodiment of the invention, indicia 36 is inscribed on the outer surface of the circular side wall 32a of the carrying case 32. In some embodiments, similar to the flap body 12 of the flexible flap assembly 100, the indicia 36 contains the product name associated with the device (e.g., the trade name of the flexible flap assembly).

Figure 8:
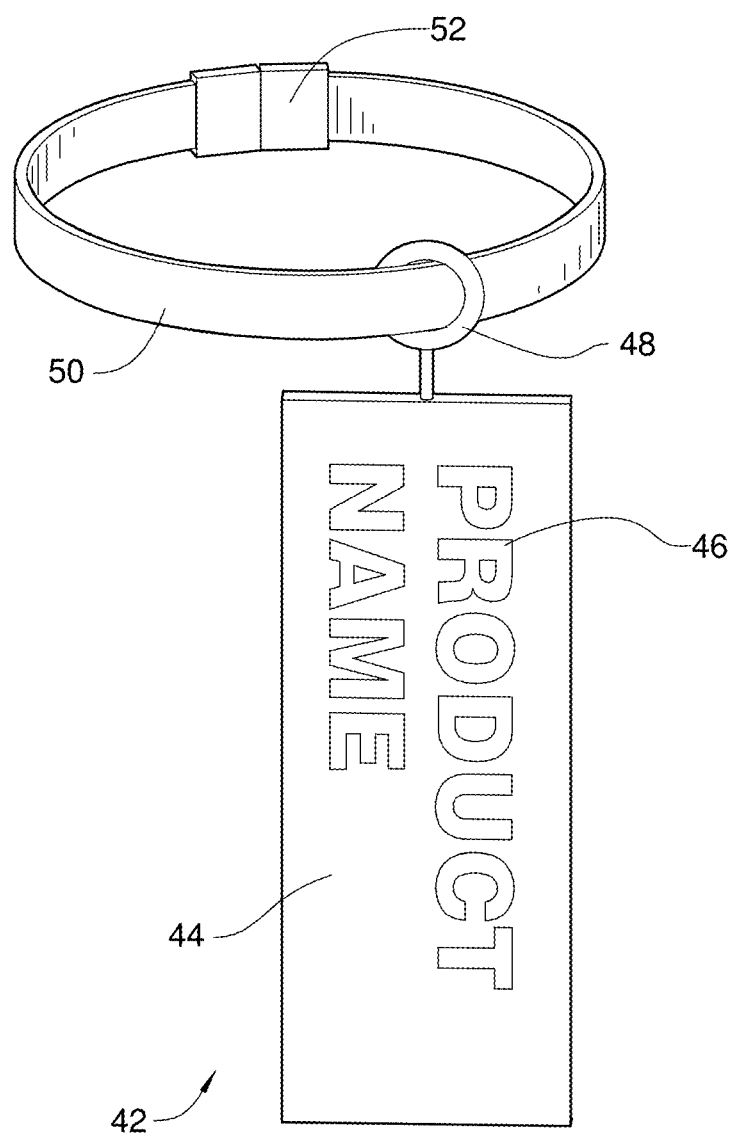
FIG. 8 is a perspective view of a flap reminder tag of the flexible flap kit according to an embodiment of the invention.

As shown in FIG. 8, the flexible flap kit also includes a flap reminder tag 42 for alerting a user that the flexible flap assembly 100, 200 is mounted to the vehicle so that the user does not forget the flexible flap assembly 100, 200 when transferring to another vehicle. For example, in the trucking industry, it is common to attach a myriad of different semi-trailers to a driver's personal cab (i.e., when the driver is transporting a particular company's semi-trailer from one location to another using his or her own personal cab). If the particular semi-trailer being transported is missing one of its standard mud flaps, the driver would install the flexible flap assembly 100, 200 thereon in order to comply with the law, and to avoid getting pulled over by a law enforcement officer. In such a case, because the flexible flap assembly 100, 200 would be mounted on the rearmost wheels of the semi-trailer, it would be easy for the driver to forget that he or she ever placed the flexible flap assembly 100, 200 on the vehicle. Consequently, the driver could inadvertently leave the flexible flap assembly 100, 200 mounted on the company's semi-trailer, thereby necessitating the purchase of a replacement flexible flap assembly 100, 200. In order to avoid such occurrence from happening, the driver can simply attach the flap reminder tag 42 to an interior member of the vehicle, which is in the driver's immediate vicinity and is readily conspicuous (e.g., on a tubular member of the sun visor). That way, when the semi-trailer is dropped off at its final destination, the driver would be reminded to remove the flexible flap assembly 100, 200 from the trailer before leaving the premises.

Referring again to FIG. 8, it can be seen that the flap reminder tag 42 comprises a tag body portion 44 having indicia 46 inscribed thereon, a ring portion 48 attached to the tag body portion 44, and a mounting strap 50 that is connected to the ring portion 48, the mounting strap 50 being configured to attach the tag body portion 44 to an interior member of a vehicle. As shown in FIG. 8, the mounting strap 50 of the flap reminder tag 42 comprises a clasp/buckle 52 for disengaging the ends of the mounting strap 50 so that it can be easily attached to various interior members in a vehicle. In one exemplary embodiment, the tag body portion 44 is preferably formed from a laminated piece of cardstock having indicia 46 inscribed thereon. In one embodiment, the indicia 46 inscribed on the piece of cardstock comprise the product name associated with the device (e.g., the trade name of the flexible flap assembly), and possibly other descriptive words relating to the device. As shown in FIG. 8, the ring portion 48 of the reminder flap tag 42 includes a small stem that is attached to the tag body portion 44. The mounting strap 50 passes through the central aperture of the ring and secures the reminder tag to an interior member of a vehicle. In another alternative embodiment, the tag body portion 44 could be attached to the mounting strap 50 using two rings, namely a first small ring that is disposed through an aperture in the tag body portion 44, and a second large ring to which the small ring is attached. In this alternative embodiment, the mounting strap 50 passes through the central aperture of the second large ring.

Figure 9:
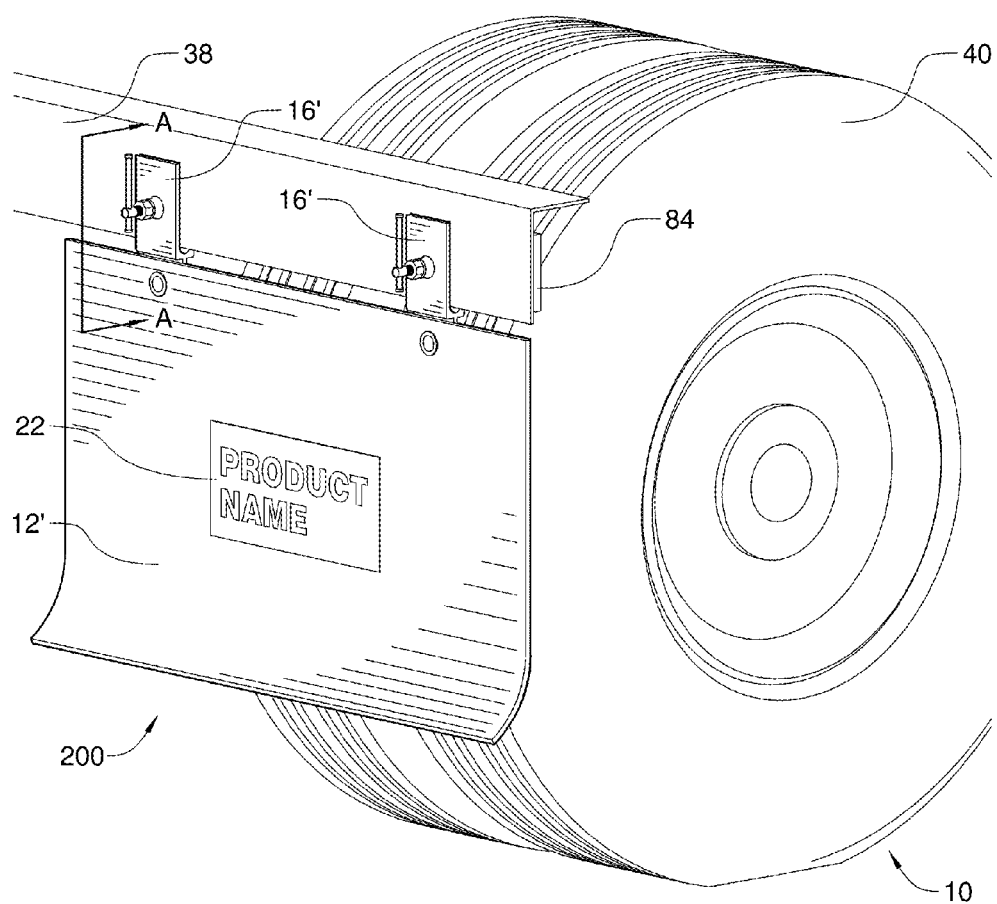
FIG. 9 is a rear perspective view of a flexible flap assembly attached to a mounting bar assembly of a truck, according to a second embodiment of the invention.
Figure 10:
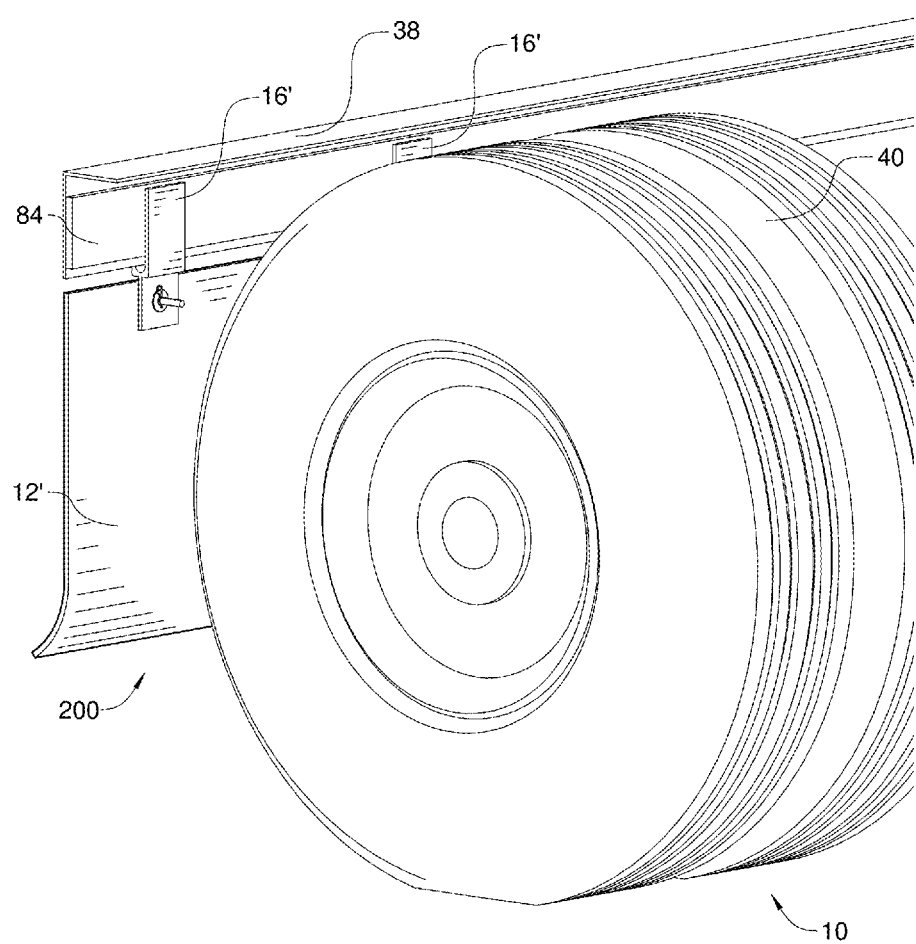
FIG. 10 is a frontal perspective view of the flexible flap assembly attached to a mounting bar assembly of a truck, according to the second embodiment of the invention.

A second embodiment of the flexible flap assembly in a mounted state is seen generally at 200 in FIGS. 9 and 10. Referring to these figures, it can be seen that, in some respects, the second exemplary embodiment is similar to that of the first embodiment. Moreover, some elements are common to both such embodiments. For the sake of brevity, the elements that the second embodiment of the flexible flap assembly has in common with the first embodiment will not be discussed because these components have already been explained in detail above. Furthermore, in the interest of clarity, these elements are denoted using the same reference characters that were used in the first embodiment.

Referring to FIGS. 9 and 10, it can be seen that the flexible flap assembly 200 of the second embodiment utilizes a different type of attachment member 16' than that of the first embodiment. Also, the flap body portion 12' of the flexible flap assembly 200 is formed from a slightly different material than the flap body portion 12 of the flexible flap assembly 100. In an exemplary embodiment, the flap body portion 12' of the flexible flap assembly 200 is formed from a textured rubber that is slightly more pliable than the material of the flap body portion 12. Although, like the flap body portion 12, the flap body portion 12' can be easily rolled into a cylindrical shape so as to permit the compact storage thereof (e.g., see FIG. 6).

Now, with reference to FIGS. 11-16, the plurality of attachment members 16' will be described. As shown in the illustrated embodiment of the invention, each attachment member 16' is in the form of a Y-shaped mounting bracket, which generally comprises a yoke portion 54 and a downwardly extending leg 62. As best illustrated in FIGS. 15 and 16, the yoke portion 54 of each attachment member 16' has a first side leg 56 and a second side leg 58. The first side leg 56 is disposed substantially parallel with respect to the second side leg 58, and is connected to the second side leg 58 by means of a bottom base leg 60 (see e.g., FIG. 14). The bottom base leg 60 extends in a direction that is generally perpendicular to the directions in which the first and second legs 56, 58 extend. The downwardly extending leg 62 of each attachment member 16' extends in a direction that is generally parallel to the extending directions of the first and second side legs 56, 58. As shown in FIGS. 14-16, the bottom interior surface of the yoke portion 54 of each attachment member 16' is preferably semi-circular (i.e., double filleted) in order to enhance the strength of the mounting bracket, as well as to reduce stress concentrations.

Figure 11:
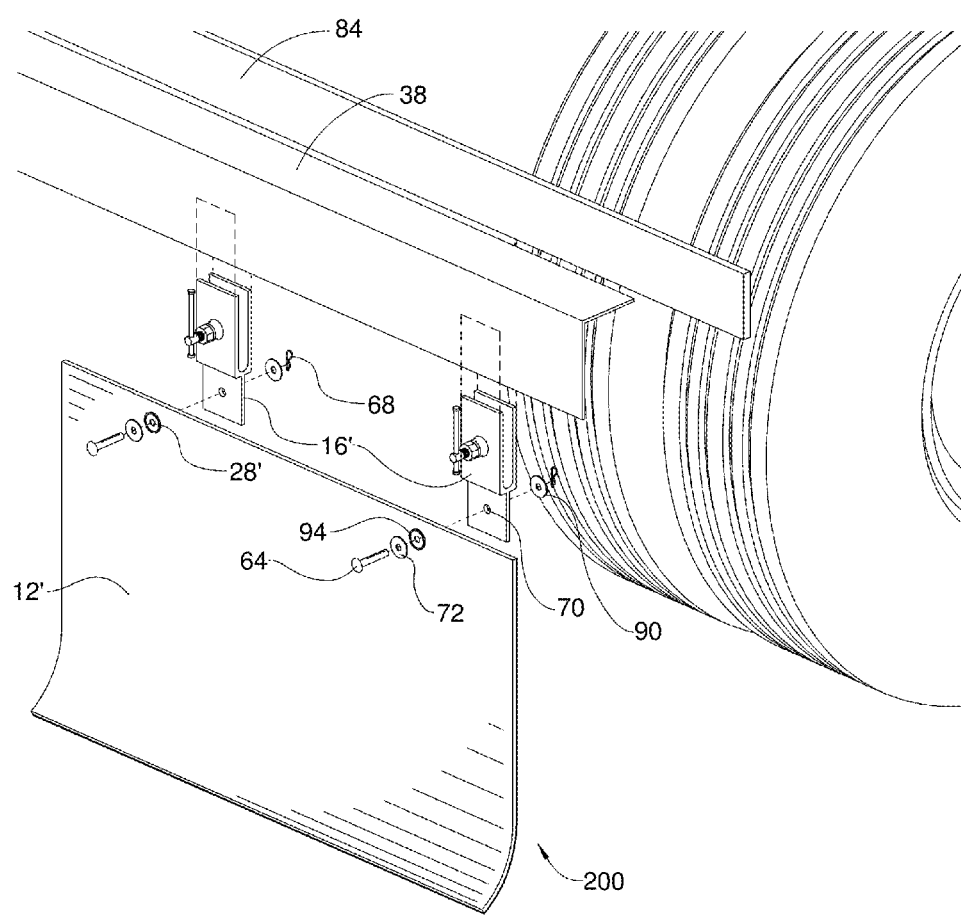
FIG. 11 is an exploded perspective view of the flexible flap assembly illustrated with a mounting bar assembly of a truck, according to the second embodiment of the invention.

With reference to FIGS. 11-14, the manner in which the flap body portion 12' is secured to the attachment members 16' will now be explained. Turning first to FIG. 11, it can be seen that the flap body portion 12' comprises two spaced apart, circular apertures 28' near the top edge 12d thereof for accommodating respective flap pins 64. The circular apertures 28' are preferably circumscribed, and defined by respective flap reinforcing grommets 94. Advantageously, the flap reinforcing grommets 94 help to prevent the tearing of the flap body portion 12' by reinforcing the material of the flap body portion 12' at locations of high stress concentration (i.e., tears in the flap body portion 12' will most likely occur above the circular apertures 28' due to the tensile forces acting on the material at these locations). In a preferred embodiment, the flap reinforcing grommets 94 are formed from a strong metallic material (e.g., steel or stainless steel) so as to endure the forces exerted thereon.

Figure 12:
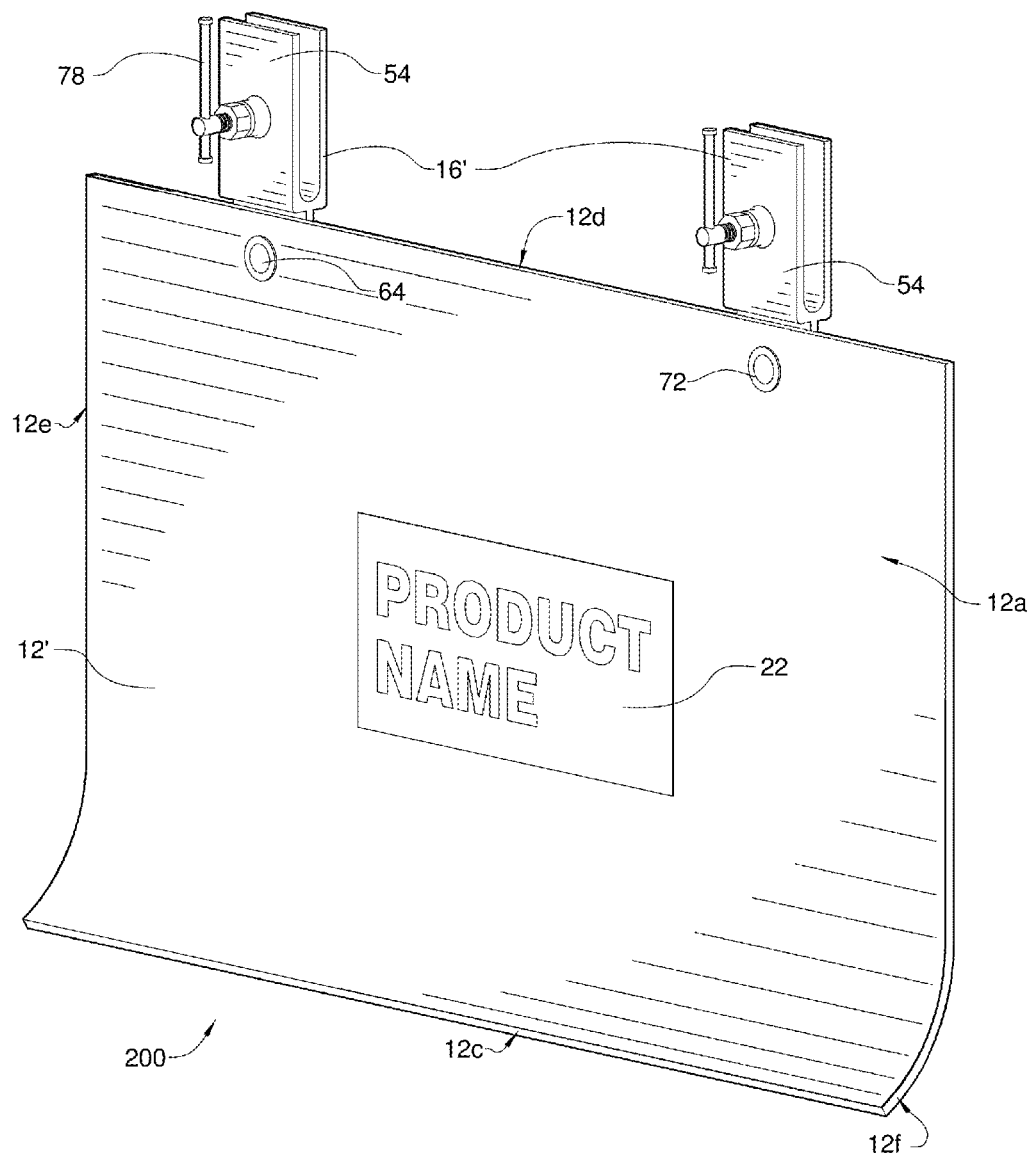
FIG. 12 is a rear perspective view of the flexible flap assembly, according to the second embodiment of the invention.
Figure 13:
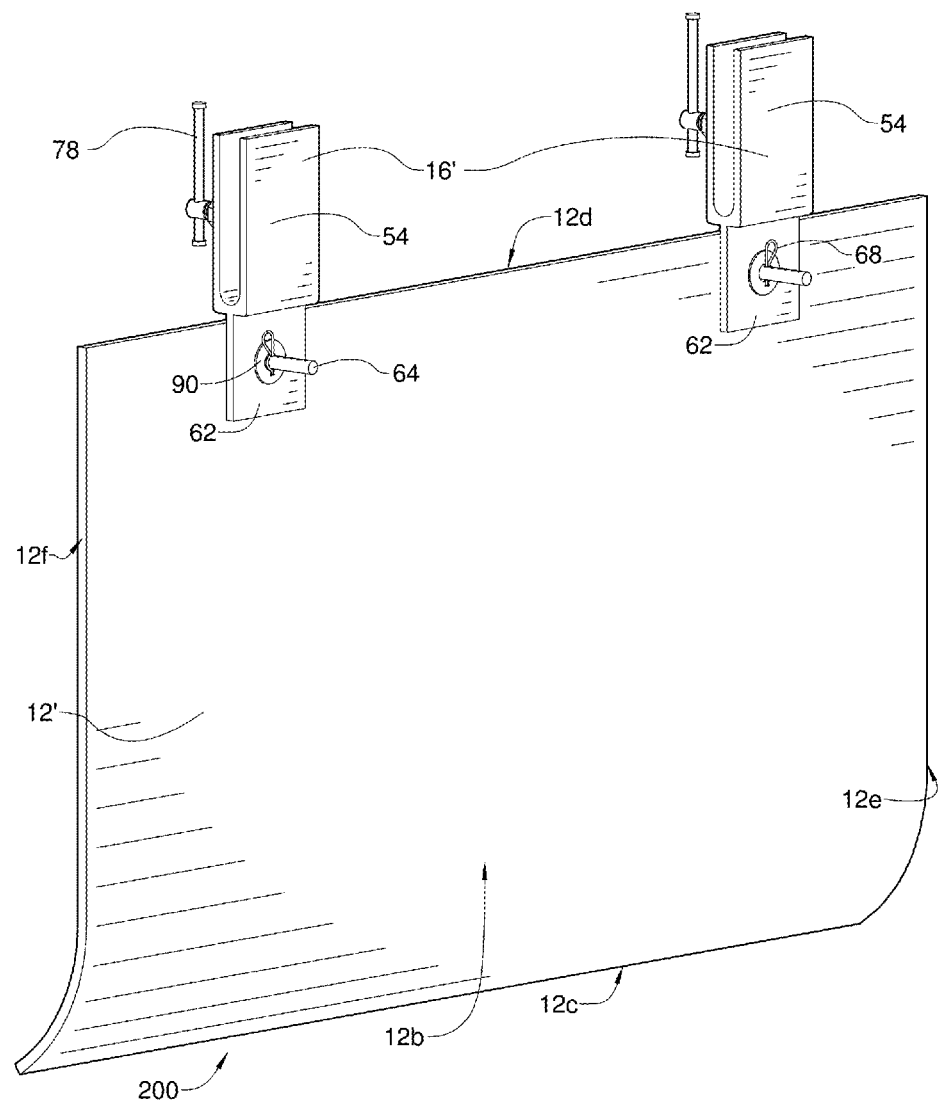
FIG. 13 is a frontal perspective view of the flexible flap assembly, according to the second embodiment of the invention.

As shown in FIGS. 11 and 12, the flap pins 64 pass through respective circular apertures 28' in the flap body portion 12' and corresponding apertures 70 in respective downwardly extending legs 62 of Y-shaped mounting brackets 16'. Referring to FIGS. 11, 12, and 14, it can be seen that a flap pin rear washer 72 is provided between the hemispherical head of each flap pin 64 and each flap reinforcing grommets 94. As illustrated, the hemispherical head of each flap pin 64 is disposed on the rear side 12a of the flap body portion 12' (see e.g., FIG. 12). On the opposite side of the flexible flap assembly 200, it can be seen that each flap pin 64 is secured in place by spring-type cotter pin 68 (see e.g., FIG. 13). Each spring-type cotter pin 68 is received within one of a plurality of apertures 66 that are spaced apart along the length of the shaft of each flap pin 64 (see e.g., FIG. 14). In order to tightly secure the flap body portion 12' to each Y-shaped mounting bracket 16', a user selects an appropriate one of the plurality of apertures 66 in the shaft of the flap pin 64 (i.e., the aperture 66 that tightly sandwiches the rear washer 72, flap body portion 12', downwardly extending leg 62, and front washer 90 together in an assembled fashion). On the front side 12b of the flap body portion 12', a flap pin washer 90 is provided between each spring-type cotter pin 68 and the surface of the downwardly extending leg 62 of each Y-shaped mounting bracket 16' (e.g., refer to FIGS. 13 and 16).

Referring to FIGS. 14-16, the securement means of the Y-shaped mounting brackets 16' will be explained. As illustrated in these figures, the yoke portion 54 of each Y-shaped mounting bracket 16' has an adjustable bolt 74 disposed through, and threadingly engaged with its first side leg 56. More specifically, each adjustable bolt 74 has a plurality of threads disposed on the outer circumference thereof which matingly engage with complementary internal threads on a fastener boss 82 disposed on each first side leg 56 (see FIG. 14). Also, as shown in FIG. 14, the first end of the adjustable bolt 74 is provided with handle 78 slidlingly disposed through an aperture in the adjustable bolt 74, while the opposed second end of the adjustable bolt 74 is provided with a conical tip 92. The handle 78 is provided with opposed flattened ends 80 so that it does not become disengaged from the aperture in the adjustable bolt 74. The flattened ends 80 of the handle 78 regulate the translation movement of the handle within the aperture of the adjustable bolt 74 (i.e., the handle cannot slide beyond the flattened end 80 because the flattened end 80 has a slightly larger diameter than the diameter of the aperture in the adjustable bolt 74). In addition, as shown in FIGS. 14 and 15, a nut 76 is also threadingly engaged with the adjustable bolt 74, adjacent to the fastener boss 82. When a user attaches the flexible flap assembly 200 to the truck mounting bar assembly 38, 84, he or she simple tightens the pointed tip 92 of the adjustable bolt 74 against the outer surface of the mounting bar assembly 38, 84 until the mounting bar assembly 38, 84 becomes tightly sandwiched within the yoke portion 54 of each Y-shaped mounting bracket 16' (see e.g., FIG. 14). In one preferred embodiment, the nut 76 is in the form of a locking nut so as to ensure that the Y-shaped mounting bracket 16' remains tightly engaged with the truck mounting bar assembly 38, 84 (e.g., the locking nut prevents the loosening of the adjustable bolt 74 while the truck is in motion).

Advantageously, the Y-shaped mounting bracket 16' of the flexible flap assembly 200 enables the assembly 200 to be used with trucks that do not contain a mounting bar assembly for attaching the strap attachment members 16. For example, some trucks merely have an edge of a planar surface (e.g., an edge of a large plate) for accommodating the attachment of the flexible flap assembly. As such, it would be impossible to utilize a strap as an attachment member for the flexible flap assembly in such a truck mounting configuration (i.e., it would not be possible to wrap the strap around the planar mounting member on the truck). Thus, the alternative attachment means 16' enables the flexible flap assembly 200 to be used on trucks that would not accommodate the strap attachment member 16, thereby enabling the flexible flap assembly to be used on these trucks as well.

A third embodiment of the flexible flap assembly is seen generally at 300 in FIG. 17. In particular, FIG. 17 illustrates a partial section view of the third embodiment of the invention. The third embodiment is similar in most respects to the aforedescribed embodiments 100, 200 of the flexible flap assembly. However, the flap body portion 12" of the flexible flap assembly 300 is formed from a different material than the flexible flap assemblies 12, 12'. Namely, the flexible flap assembly 300 is formed from a heavy weight vinyl material, rather than the rubber materials described in conjunction with the previous two embodiments 100, 200 of the flexible flap assembly. Because the flap body portion 12"

is formed from a vinyl material, which is lighter in weight than the aforedescribed rubber materials, the bottom edge 12c of the flap body portion 12" is provided with a transverse elongated rod 96 that extends substantially the width of the flap body portion 12". Preferably, the transverse elongated rod 96 is formed from a heavy, durable material, such as a metal (e.g., steel), so as to maintain the lighter weight flap body portion 12" in a generally vertical configuration when it is mounted on a truck. Otherwise, without the transverse elongated rod 96, the lighter weight flap body portion 12" would be readily susceptible to fluid-induced forces during travel (i.e., the bottom edge 12c of the flap body portion 12" would tend to blow upward during travel, thereby greatly diminishing its ability to prevent debris from being thrown from the wheels of the truck).

As shown in FIG. 17, in order to create a "pocket" for receiving the transverse elongated rod 96, the bottom edge 12c of the flap body portion 12" is preferably folded over itself, and the loose edge of the flap body portion 12" is preferably attached to the surface of the flap body portion 12" using a suitable means of attachment (e.g., stitching, an adhesive, heat welding, etc.). In addition, the ends of the pocket, which are disposed near the left and right edges 12e, 12f of the flap body portion 12", can also be closed by similar suitable means of attachment (e.g., stitching, an adhesive, heat welding, etc.).

Now, the manner in which the flexible flap kit is utilized by user will be described in detail. Initially, the installation of the flexible flap assembly 100 on a vehicle will be explained. After which, the process for removing the flexible flap assembly 100 from the vehicle will be described.

The installation procedure for mounting the inventive device on a vehicle commences when a user removes the end cap of the carrying case 32, and removes the flexible flap assembly 100 from the case 32. Then, the user removes the mounting strap 50 of the flap reminder tag 42, which is disposed around the periphery of the rolled flexible flap assembly 100 during storage (e.g., as depicted in FIG. 6), and unrolls the flexible flap assembly 100. Prior to mounting of the flexible flap assembly 100 on the vehicle, it is preferable for the user to verify that the three (3) mounting straps 24 are in a looped configuration so as to enable the easier installation of the device 100. After which, the user slides the mounting straps 24 of the flexible flap assembly 100 over the mud flap mounting bar assembly on the vehicle (e.g., the mounting bar assembly 38, 84 of a truck 10 as illustrated in FIG. 1), and centers the flap assembly 100 thereon. Then, the user pulls the three (3) mounting straps 24 tight using the buckles 26 in order to ensure that the flexible flap assembly 100 is secured to the mud flap mounting bar on the vehicle (e.g., the mounting bar assembly 38, 84 of truck 10). Finally, the user places the flap reminder tag 42 in the interior of the vehicle in a readily visible location so that he or she does not forget that the flexible flap assembly 100 is mounted on an exterior portion of the vehicle.

Now, the removal procedure for dismounting the flexible flap assembly 100 from the vehicle will be explained. First, a user loosens each of the three (3) mounting straps 24 of the flexible flap assembly 100, but preferably leaves the straps 24 looped so as to facilitate the future installation of the flexible flap assembly 100. Then, the user slides the flexible flap assembly 100 off the mud flap mounting bar of the vehicle (e.g., the mounting bar assembly 38, 84 of truck 10). After which, the user lays the flexible flap assembly 100 on a flat surface (e.g., a flat portion of pavement) and rolls up the flap assembly 100, beginning with the bottom edge 12c of the flap body portion 12. Finally, the user secures the rolled flexible flap assembly 100 by slipping the mounting strap 50 of the flap reminder tag 42 thereover (see e.g., FIG. 6), and places the flexible flap assembly 100 in the carrying case 32 for future use.

The installation and removal procedure for the flexible flap assembly 200 is similar to that described above for the flexible flap assembly 100, except for the manner in which the flexible flap assembly 200 is mounted to, and dismounted from, the vehicle (all other steps are the same as those for flexible flap assembly 100). As described above, the flexible flap assembly 200 has attachment members 16' in the form of Y-shaped mounting brackets, rather than attachment members 16 in the form of straps as utilized by the flexible flap assembly 100. In order to attach the flexible flap assembly 200 to the vehicle (e.g., to a planar mounting member on a truck), the pointed tip 92 of each adjustable bolt 74 on each Y-shaped mounting bracket 16' is tightened against the surface of the mounting member on the truck until each Y-shaped mounting bracket 16' is securely attached to the mounting member (i.e., the edge portion of the truck mounting member is tightly sandwiched within the yoke portion 54 of each Y-shaped mounting bracket 16'). A user rotates each adjustable bolt 74 by grasping its respective handle 78, and rotating the handle 78 (e.g., in a clockwise direction) until the pointed tip 92 of each adjustable bolt 74 becomes tightly engaged against the surface of the mounting member. As each adjustable bolt 74 is rotated (e.g., in a clockwise direction), the interaction between the external threads of each bolt 74 and their respective complementary internal threads on the fastener boss 82 result in the consequential axial translation of the pointed tip 92 towards the mounting surface (and towards the inner surface of second leg 58 of yoke portion 54).

In order to detach the flexible flap assembly 200 from the vehicle, a user simply rotates the adjustable bolt 74 of each Y-shaped mounting bracket 16' in a rotational direction opposite to that which was used for the tightening thereof (e.g., counter-clockwise). In particular, similar to that described above for attachment, a user rotates each adjustable bolt 74 by grasping its respective handle 78, and rotating the handle 78 (e.g., in a counter-clockwise direction) until the pointed tip 92 of each adjustable bolt 74 becomes disengaged from the surface of the truck mounting member. As each adjustable bolt 74 is rotated (e.g., in a counter-clockwise direction), the interaction between the external threads of each bolt 74 and their respective complementary internal threads on the fastener boss 82 result in the consequential axial translation of the pointed tip 92 away from the mounting surface (and away from the inner surface of second leg 58 of yoke portion 54). Once each adjustable bolt 74 has been displaced a sufficient distance away from the surface of the truck mounting member (e.g., when the tip 92 is one-sixteenth of an inch away from the surface), each Y-shaped mounting bracket 16' can simply be slid off the edge of the truck mounting member and stowed away. The other steps described above for the flexible flap 100 are performed in the same manner for the flexible flap assembly 200, and thus, there is no need to reiterate these same steps for the flexible flap assembly 200. In addition, it is to be understood that the installation and removal procedures are performed in the same manner for flexible flap assembly 300. If the flexible flap assembly 300 utilizes strap-type attachment members 16, then the steps will be the same as those described for flexible flap assembly 100. If the flexible flap assembly 300 uses attachment members 16' in the form of Y-shaped mounting brackets, then the procedural steps will be the same as those explained for flexible flap assembly 200.

Figure 18:
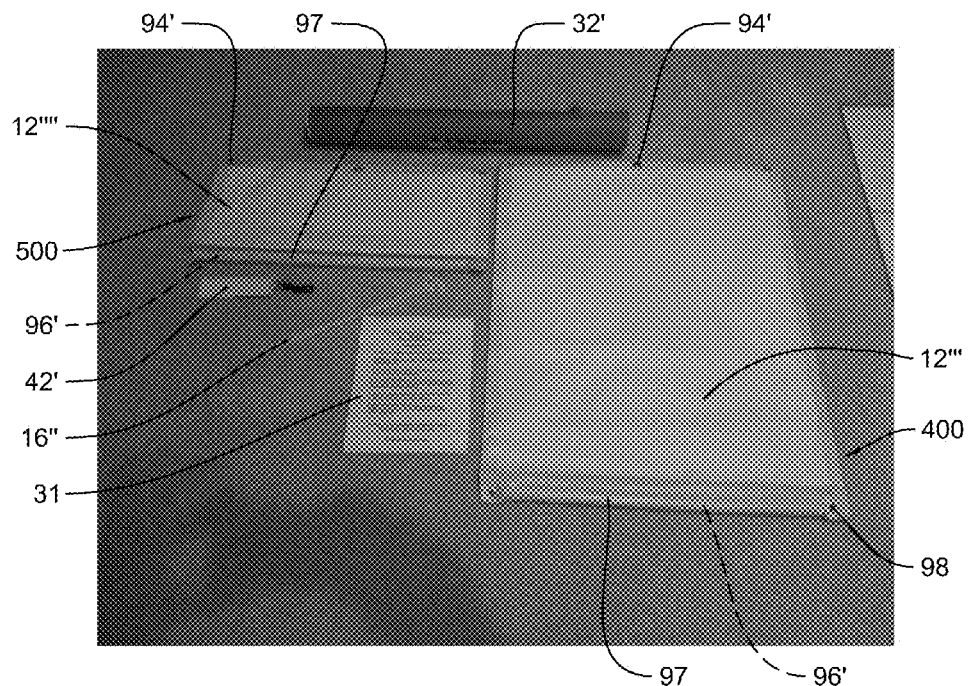
FIG. 18 is a perspective view of a flexible flap kit, according to another embodiment of the invention, wherein the flexible flap kit is provided with different-sized flaps.
Figure 19:
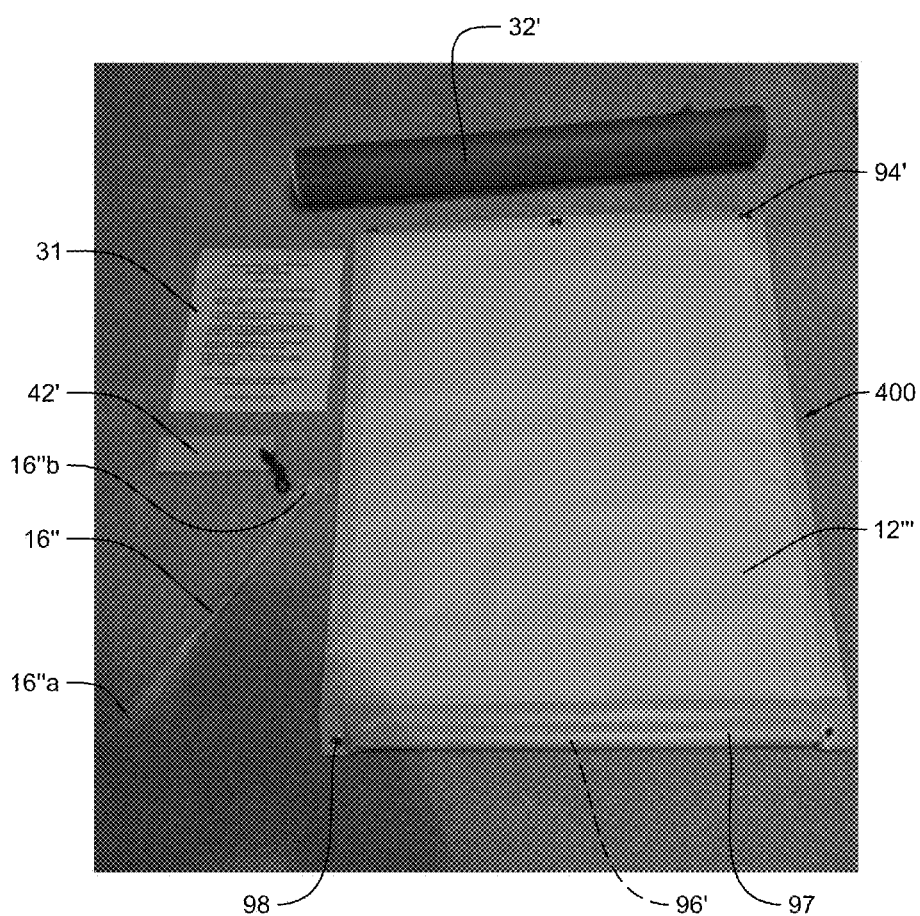
FIG. 19 is a perspective view of a flexible flap kit, according to yet another embodiment of the invention, wherein the flexible flap kit is provided with a single, large flap.

Now, with reference to FIGS. 18 and 19, alternative embodiments of the flexible flap kit will be described. Referring initially to FIG. 18, it can be seen that the flexible flap kit illustrated in this figure generally comprises a first flexible flap assembly 400 in the form of a long flap, a second flexible flap assembly 500 in the form of a short flap, a flap kit instruction sheet 31 explaining how to use the flap kit, a flap carrying case 32', a flap reminder tag 42', and a plurality of attachment straps 16" for attaching the flaps 400, 500 to a vehicle. The flexible flap kit depicted in FIG. 19 includes generally the same components as that illustrated in FIG. 18, except that the kit of FIG. 19 only includes the flexible flap assembly 400 in the form of a long flap, rather than both flexible flap assemblies 400, 500. In the embodiments of FIGS. 18 and 19, the flap carrying case 32' is formed from a cardboard tube, rather than the plastic tube described above for the flap carrying case 32.

Next, referring to referring to FIGS. 18 and 19, a fourth embodiment of the flexible flap assembly 400 will be described. The fourth embodiment is similar in many respects to the aforedescribed third embodiment 300 of the flexible flap assembly. In particular, like the flap body portion 12" of the flexible flap assembly 300, the flap body portion 12''' of the flexible flap assembly 400 is formed from a heavy weight vinyl material (e.g., a polyvinyl chloride (PVC) material), rather than the rubber materials described in conjunction with the first two embodiments 100, 200 of the flexible flap assembly. As described above for the third embodiment, because the flap body portion 12''' is formed from a vinyl material, which is lighter in weight than the aforedescribed rubber materials, the bottom edge of the flap body portion 12''' of the flexible flap assembly 400 is provided with a transverse elongated rod 96' that extends substantially the width of the flap body portion 12'''. Preferably, the transverse elongated rod 96' is formed from a heavy, durable material, such as a metal (e.g., steel), so as to maintain the lighter weight flap body portion 12''' in a generally vertical configuration when it is mounted on a truck. Otherwise, without the transverse elongated rod 96', the lighter weight flap body portion 12''' would be readily susceptible to fluid-induced forces during travel (i.e., the bottom edge of the flap body portion 12''' would tend to blow upward during travel, thereby greatly diminishing its ability to prevent debris from being thrown from the wheels of the truck).

As shown in FIGS. 18 and 19, the transverse elongated rod 96' is disposed within a pocket 97 formed in the lower end region of the flap body portion 12'''. The pocket 97 substantially encloses the transverse elongated rod 96' within flap body portion 12''' of the flexible flap assembly 400.

Also, as depicted in FIGS. 18 and 19, it can be seen that the upper end region of flap body portion 12''' of the flexible flap assembly 400, which is disposed opposite to the lower end region with pocket 97, comprises a plurality of spaced-apart apertures for accommodating respective ones of the attachment straps 16". Each of the spaced-apart apertures is defined by, and circumscribed by, a respective reinforcing member 94' (e.g., which may be in the form of a circular reinforcing grommet or eyelet). Similarly, the lower end region of the flap body portion 12''' of the flexible flap assembly 400 is also provided with a pair of reinforcing members 98 (e.g., which may be in the form of circular reinforcing grommets or eyelets) disposed on opposite ends of the transverse elongated rod 96' (see FIGS. 18 and 19). The pair of reinforcing members 98 on the bottom of the flap body portion 12''' may be used for securing the flexible flap assembly 400 in its rolled state when it is not in use.

With combined reference to FIGS. 18 and 19, the flap retaining straps 16" of the illustrative embodiment will be described in detail. In the embodiments of FIGS. 18 and 19, each of the flap retaining straps 16" is in the form of a cable tie or zip tie. As best shown in FIG. 19, each of the plurality of cable ties 16" comprises a first end 16"a and a second end 16"b disposed opposite to the first end 16"a. In the illustrative embodiment, the first end 16"'a of each of the plurality of cable ties has a pointed tip, while the second end 16"b of each of the plurality of cable ties 16" has a ratchet disposed within a partially enclosed housing (i.e., a small open case). Each of the plurality of cable ties 16" further comprises an integrally formed gear track formed along the length thereof that is configured to engage with the ratchet disposed at the second end 16"b. In an exemplary embodiment, each of the plurality of cable ties 16" may comprise a flexible nylon band with an integrally formed gear rack formed along the length thereof. In one exemplary embodiment, once the pointed tip at the first end 16"a of the cable tie 16" has been pulled through the housing at the second end 16"b, and past the ratchet, it is prevented from being pulled back. As such, in this exemplary embodiment, the resulting loop may only be pulled tighter. In contrast, in an alternative exemplary embodiment, the pointed tip at the first end 16"a of the cable tie 16" may be released from the ratchet mechanism at the second end 16"b (e.g., by means of a small lever) so that the cable tie 16" may be reused (e.g., for the attachment of the flap to another vehicle). In other words, in the alternative exemplary embodiment, the cable ties or zip ties 16" may be of the releasable-type so that they can be used repeatedly without requiring replacement after each use. Also, in another alternative embodiment, C-shaped clamps or brackets may be used to secure the flexible flap assemblies 400, 500 to the vehicle (e.g., in applications where it is not possible to fasten the cable ties or zip ties 16" around a bar-shaped member of the vehicle.

The fifth embodiment of the flexible flap assembly 500, which is also depicted in FIG. 18, is similar in most respects to the aforedescribed fourth embodiment 400 of the flexible flap assembly. However, the flap body portion 12"" of the flexible flap assembly 500 has a shorter overall length than the flap body portion 12"" of the flexible flap assembly 400 so that it can be used on trucks that can only accommodate a shorter flap (i.e., trucks having lower ground clearance applications). For example, in the illustrated embodiment, the flap body portion 12"" of the flexible flap assembly 500 has a length that is approximately one-third (⅓) the length of the flap body portion 12''' of the flexible flap assembly 400. Although, in FIG. 18, it can be seen that the width of the flap body portion 12"" of the flexible flap assembly 500 is generally equal to the width of the flap body portion 12''' of the flexible flap assembly 400.

It is readily apparent that the aforedescribed flexible flap assembly 100, 200, 300, 400, 500 and associated kit offers numerous advantages. First of all, the flexible flap assembly 100, 200, 300, 400, 500 can be quickly and easily installed on a vehicle (e.g., a truck) that is missing a mud flap. Moreover, the flexible flap assembly 100, 200, 300, 400, 500 is capable of being easily installed on a vehicle without the use of any tools. Furthermore, the flexible flap assembly kit greatly enhances the functionality of the flexible flap assembly 100, 200, 300, 400, 500 by including a carrying case for stowage of the flexible flap assembly 100, 200, 300, 400, 500 and a flap reminder tag 42 for preventing a user of the device from inadvertently leaving the flexible flap assembly 100, 200, 300, 400, 500 on a vehicle (e.g., on a trailer) after it has been dropped off at its destination.

In order to clearly demonstrate that the aforedescribed flexible flap assembly could be quickly mounted to, and dismounted from, a vehicle, the inventors of the aforedescribed device performed a plurality of timed trials. During each trial, one of the inventors mounted the flexible flap assembly to a vehicle and the other of the inventors recorded the duration of time for the flap installation procedure. Similarly, during each trial, one of the inventors dismounted the flexible flap assembly from the vehicle and the other of the inventors recorded the duration of time for the flap removal procedure. The results of these trials are provided in the table below:

TABLE 1

Flexible Flap Assembly Installation and Removal Times

| Trial Number | Installation Time | Removal Time |
| --- | --- | --- |
| 1 | 5 min. 40 sec. | 3 min. 10 sec. |
| 2 | 3 min. 0 sec. | 2 min. 45 sec. |
| 3 | 3 min. 25 sec. | 2 min. 25 sec. |
| Average | 4 min. 2 sec. | 2 min. 47 sec. |

The installation times listed in Table 1 included the time required to remove the flexible flap assembly from its carrying case 32, and the time required to install the flexible flap assembly on a vehicle mounting bar. The removal times listed in Table 1 included the time required to remove the flexible flap assembly from the vehicle mounting bar, and the time required to stow the flexible flap assembly back into its carrying case 32. As shown in Table 1, the average installation time for the flexible flap assembly was 4 minutes and 2 seconds, whereas the average removal time for the flexible flap assembly was 2 minutes and 47 seconds. These results demonstrate that the flexible flap assembly of the present invention can be installed and removed from the vehicle in a relatively short period of time, thereby illustrating its suitability for emergency use when a driver suddenly realizes that the vehicle he or she is about to transport is missing one of its permanent mud flaps.

Although the invention has been shown and described with respect to a certain embodiment or embodiments, it is apparent that this invention can be embodied in many different forms and that many other modifications and variations are possible without departing from the spirit and scope of this invention. Also, while the invention has been shown and described with regard to several different embodiments, it is to be understood that the elements of these various embodiments may be combined with one another.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A flexible flap assembly configured to be mounted behind a wheel of a vehicle, said flexible flap assembly comprising:

a flap body portion, said flap body portion being formed from a flexible material; and a plurality of attachment members operatively coupled to an upper end region of said flap body portion, said plurality of attachment members being in the form of a plurality of retaining straps, said plurality of retaining straps comprising a plurality of cable ties, each of said plurality of cable ties comprising a first end and a second end disposed opposite to said first end, said first end of each of said plurality of cable ties having a pointed tip, said second end of each of said plurality of cable ties having a ratchet disposed within a partially enclosed housing, each of said plurality of cable ties further comprising an integrally formed gear track formed thereon that is configured to engage with said ratchet disposed at said second end;

wherein said flexible flap assembly is configured to be releasably mounted to a portion of said vehicle using said plurality of retaining straps.

2. The flexible flap assembly according to claim 1, wherein said flap body portion is formed from a flexible polymeric material.

3. The flexible flap assembly according to claim 2, wherein said flexible polymeric material forming said flap body portion comprises a vinyl material.

4. The flexible flap assembly according to claim 1, wherein said flap body portion is readily capable of being rolled and unrolled so as to facilitate the storage of the flexible flap assembly.

5. The flexible flap assembly according to claim 1, wherein said flexible flap assembly is configured to be mounted to, and dismounted from, said portion of said vehicle without the use of tools.

6. The flexible flap assembly according to claim 1, wherein said flap body portion has an upper end region and a lower end region disposed opposite to said upper end region, said upper end region of said flap body portion comprising a plurality of spaced-apart apertures, each of said plurality of retaining straps being received within a respective one of said plurality of spaced-apart apertures in said upper end region of said flap body portion.

7. The flexible flap assembly according to claim 6, wherein said upper end region of said flap body portion of said flexible flap assembly further comprises at least one reinforcing member surrounding at least one of said plurality of spaced-apart apertures.

8. The flexible flap assembly according to claim 6, wherein said lower end region of said flap body portion comprises an elongate rod for increasing the weight of said lower end region of said flap body portion so as to prevent said flap body portion from blowing upward when said flexible flap assembly is installed on said vehicle.

9. The flexible flap assembly according to claim 8, wherein said elongate rod is disposed within a pocket formed in said lower end region of said flap body portion.

10. A flexible flap assembly configured to be mounted behind a wheel of a vehicle, said flexible flap assembly comprising:

a flap body portion, said flap body portion being formed from a flexible material;

a stiffening member, said stiffening member being disposed adjacent to an upper edge of said flap body portion; and a plurality of attachment members operatively coupled to an upper end region of said flap body portion and said stiffening member, said plurality of attachment members comprising a plurality of mounting brackets, each of said plurality of mounting brackets having an adjustable bolt with a handle disposed at an end thereof for securing said flexible flap assembly to said portion of said vehicle, each of said plurality of mounting brackets being generally Y-shaped, each said mounting bracket having a yoke portion for engaging said portion of said vehicle and a depending leg portion extending outwardly from a base of said yoke portion, each of said depending leg portions of said mounting brackets being attached to said upper end region of said flap body portion;

wherein said flexible flap assembly is configured to be releasably mounted to a portion of said vehicle using said plurality of attachment members.

11. The flexible flap assembly according to claim 10, further comprising a plurality of fasteners attaching said stiffening member to said flap body portion adjacent to said upper edge thereof.

12. The flexible flap assembly according to claim 11, wherein said plurality of fasteners comprises a plurality of retaining bolts that matingly engage with a plurality of nuts.

13. The flexible flap assembly according to claim 10, wherein said stiffening member is integrally formed with said upper end region of said flap body portion.

14. The flexible flap assembly according to claim 10, wherein said flexible flap assembly is configured to be mounted to, and dismounted from, said portion of said vehicle without the use of tools.

15. The flexible flap assembly according to claim 10, wherein said portion of said vehicle is a mounting bar behind said wheel of said vehicle.

16. The flexible flap assembly according to claim 10, wherein each of said adjustable bolts of said mounting brackets is disposed through an opposed leg of said yoke portion.

\* \* \* \* \*